United States Patent
Morita et al.

(10) Patent No.: US 11,897,068 B2
(45) Date of Patent: Feb. 13, 2024

(54) INFORMATION PROCESSING METHOD, INFORMATION PROCESSING SYSTEM, AND INFORMATION PROCESSING DEVICE

(71) Applicant: DMG MORI CO., LTD., Yamatokoriyama (JP)

(72) Inventors: Yasuhiko Morita, Yamatokoriyama (JP); Masafumi Takahashi, Sapporo (JP); Satoshi Miyamoto, Yamatokoriyama (JP); Sumihiro Kiyota, Yamatokoriyama (JP); Masakazu Takayama, Yamatokoriyama (JP); Katsuhiko Ono, Yamatokoriyama (JP)

(73) Assignee: DMG MORI CO., LTD., Yamatokoriyama (JP)

( * ) Notice: Subject to any disclaimer, the term of this patent is extended or adjusted under 35 U.S.C. 154(b) by 1218 days.

(21) Appl. No.: 16/467,901

(22) PCT Filed: Aug. 24, 2017

(86) PCT No.: PCT/JP2017/030288
§ 371 (c)(1),
(2) Date: Jun. 7, 2019

(87) PCT Pub. No.: WO2018/105175
PCT Pub. Date: Jun. 14, 2018

(65) Prior Publication Data
US 2020/0061768 A1    Feb. 27, 2020

(30) Foreign Application Priority Data

Dec. 9, 2016 (JP) .................. 2016-239830

(51) Int. Cl.
| | | |
|---|---|---|
| *B23Q 17/09* | (2006.01) | |
| *G05B 13/02* | (2006.01) | |
| *G05B 23/02* | (2006.01) | |

(52) U.S. Cl.
CPC ....... *B23Q 17/0995* (2013.01); *G05B 13/024* (2013.01); *G05B 13/0265* (2013.01);
(Continued)

(58) Field of Classification Search
None
See application file for complete search history.

(56) References Cited

U.S. PATENT DOCUMENTS

| | | | |
|---|---|---|---|
| 6,260,427 B1 | 7/2001 | Jones et al. | |
| 6,295,510 B1 * | 9/2001 | Discenzo | H02P 9/02 |
| | | | 702/183 |

(Continued)

FOREIGN PATENT DOCUMENTS

| | | | |
|---|---|---|---|
| EP | 1 043 118 A1 | 10/2000 | |
| EP | 1 296 211 A1 | 3/2003 | |

(Continued)

OTHER PUBLICATIONS

Yu, Jianbo. "Machine tool condition monitoring based on an adaptive Gaussian mixture model." Journal of manufacturing science and engineering 134.3 (2012). (Year: 2012).*

(Continued)

*Primary Examiner* — Carlos R Ortiz Rodriguez
(74) *Attorney, Agent, or Firm* — Oblon, McClelland, Maier & Neustadt, L.L.P.

(57) ABSTRACT

Provided is an information processing method capable of effectively utilizing a variety of types of information collected from a machine tool. The information processing method includes the step of communicating with a plurality of machine tools (S10). The plurality of machine tools each (Continued)

include a sensor to sense information about the machine tool as sensed information. The step of communicating (S10) includes the step of receiving as collected data from each of the plurality of machine tools part information about a part of the machine tool and the sensed information obtained by the sensor. The information processing method further includes the steps of storing in a storage unit the collected data received from each of the plurality of machine tools (S20A, S20B); and based on the plurality of collected data stored in the storage unit, learning a correlation between part information of a machine tool and sensed information obtained by the sensor internal to that machine tool (S32).

5 Claims, 21 Drawing Sheets

(52) U.S. Cl.
CPC ...... *G05B 23/0229* (2013.01); *B23Q 17/0952* (2013.01); *B23Q 2717/003* (2013.01)

(56) References Cited

U.S. PATENT DOCUMENTS

| | | |
|---|---|---|
| 2002/0013664 A1 | 1/2002 | Strackeljan et al. |
| 2003/0115510 A1 | 6/2003 | Takayama |
| 2008/0097945 A1 | 4/2008 | Greis et al. |
| 2011/0216354 A1 | 9/2011 | Naito |
| 2014/0261791 A1 | 9/2014 | Grabau et al. |
| 2014/0351642 A1 | 11/2014 | Bates et al. |
| 2015/0293523 A1 | 10/2015 | Yamamoto et al. |
| 2015/0323425 A1 | 11/2015 | Bang et al. |
| 2016/0091393 A1 | 3/2016 | Liao et al. |
| 2017/0032283 A1 | 2/2017 | Kamiya |
| 2017/0185970 A1 | 6/2017 | Nakazato |

FOREIGN PATENT DOCUMENTS

| | | |
|---|---|---|
| EP | 3 119 176 A1 | 1/2017 |
| JP | 2002-530768 A | 9/2002 |
| JP | 2003-177815 A | 6/2003 |
| JP | 2004-501465 A | 1/2004 |
| JP | 2004-86338 A | 3/2004 |
| JP | 2015-153914 A | 8/2015 |
| JP | 2015-203646 A | 11/2015 |
| JP | 5992087 B1 | 9/2016 |
| JP | 5997330 B1 | 9/2016 |
| JP | 2017-33239 A | 2/2017 |
| KR | 10-2011-0092220 A | 8/2011 |
| WO | WO 00/12259 A1 | 3/2000 |
| WO | WO 00/31510 A1 | 6/2000 |
| WO | WO 01/98849 A2 | 12/2001 |
| WO | WO 02/03156 A1 | 1/2002 |

OTHER PUBLICATIONS

International Search Report dated Nov. 21, 2017 in PCT/JP2017/030288 filed on Aug. 24, 2017.

Kenji Kataoka, et al., "Implementation of Operator Support System using Dynamic Simulator for Abnormal Plant Condition", International Conference on Computational Intelligence for Modeling Control and Automation and International Conference on Intelligent Agents, Web Technologies and Internet Commerce, XP31002815A. (2006), 6 pages.

* cited by examiner

FIG.3

| | DEVICE ID | TIMING OF SENSING | SENSED INFORMATION ||||| PART INFORMATION ||
|---|---|---|---|---|---|---|---|---|
| | | | TEMPERATURE | ELECTRIC POWER | ACCELERATION | VALUE OF CURRENT | PART ID | TIMING OF REPLACEMENT OF PART |
| 125A | DEVICE 1 | t1 | T1 | W1 | A1 | I1 | | |
| 125B | DEVICE 1 | t2 | T2 | W2 | A2 | I2 | PART 1 | t11 |
| 125C | DEVICE 1 | t3 | T3 | W3 | A3 | I3 | | |
| 125D | DEVICE 2 | t4 | T4 | W4 | A4 | I4 | | |
| 125E | DEVICE 2 | t5 | T5 | W5 | A5 | I5 | PART 2 | t12 |
| 125F | DEVICE 2 | t6 | T6 | W6 | A6 | I6 | | |
| 125G | DEVICE 2 | t7 | T7 | W7 | A7 | I7 | | |
| 125H | ... | ... | ... | ... | ... | ... | ... | ... |

124

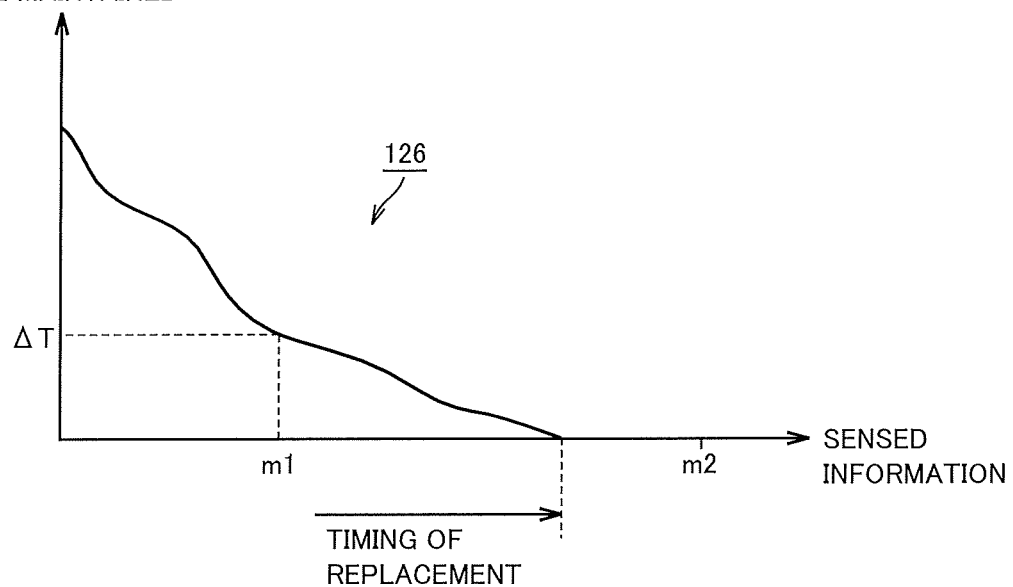

| DEVICE ID | TIMING OF SENSING | SENSED INFORMATION ||||  PART INFORMATION || OPERATION INFORMATION |||
|---|---|---|---|---|---|---|---|---|---|---|
| | | TEMPERATURE | ELECTRIC POWER | ACCELERATION | VALUE OF CURRENT | PART ID | TIMING OF REPLACEMENT OF PART | TRAVELED DISTANCE | OPERATION TIME OF SPINDLE | POWER SUPPLY ON/OFF | ALARM ID |
| DEVICE 1 | t1 | T1 | W1 | A1 | I1 | PART 1 | t11 | L1 | W1 | ON | — |
| DEVICE 1 | t2 | T2 | W2 | A2 | I2 | | | L2 | W2 | ON | ALARM 2 |
| DEVICE 1 | t3 | T3 | W3 | A3 | I3 | | | L3 | W3 | ON | ALARM 3 |
| DEVICE 2 | t4 | T4 | W4 | A4 | I4 | PART 2 | t12 | L4 | W4 | OFF | — |
| DEVICE 2 | t5 | T5 | W5 | A5 | I5 | | | L5 | W5 | OFF | — |
| DEVICE 2 | t6 | T6 | W6 | A6 | I6 | | | L6 | W6 | ON | ALARM 6 |
| DEVICE 2 | t7 | T7 | W7 | A7 | I7 | | | L7 | W7 | ON | ALARM 7 |
| ... | ... | ... | ... | ... | ... | ... | ... | ... | ... | ... | ... |

| | DEVICE ID | ALARM ID | TIME OF ISSUANCE | COUNTERMEASURE |
|---|---|---|---|---|
| 125I | DEVICE 1 | ALARM 1 | t1 | COUNTERMEASURE 1 |
| 125J | DEVICE 1 | ALARM 2 | t2 | COUNTERMEASURE 2 |
| 125K | DEVICE 1 | ALARM 3 | t3 | COUNTERMEASURE 3 |
| 125L | DEVICE 2 | ALARM 4 | t4 | COUNTERMEASURE 4 |
| 125M | DEVICE 2 | ALARM 5 | t5 | COUNTERMEASURE 5 |
| 125N | DEVICE 2 | ALARM 6 | t6 | COUNTERMEASURE 6 |
| 125O | DEVICE 2 | ALARM 7 | t7 | COUNTERMEASURE 7 |
| 125P | ⋮ | ⋮ | ⋮ | ⋮ |

| DEVICE ID | PART ID | SENSED INFORMATION | | |
|---|---|---|---|---|
| | | NORMAL RANGE (TEMPERATURE) | NORMAL RANGE (ACCELERATION) | ... |
| ID1 | PART 1 | T1~T2 | A1~A2 | ... |
| ID1 | PART 2 | T3~T4 | A3~A4 | ... |
| ID1 | PART 3 | T5~T6 | A5~A6 | ... |
| ID2 | PART 4 | T7~T8 | A7~A8 | ... |
| ID2 | PART 5 | T9~T10 | A9~A10 | ... |
| ID2 | PART 6 | T11~T12 | A11~A12 | ... |
| ID2 | PART 7 | T13~T14 | A13~A14 | ... |
| ⋮ | ⋮ | ⋮ | ⋮ | ⋮ |

FIG.19

| NAME OF CUSTOMER | ○○ |
| --- | --- |
| MODEL TYPE | ○○ |
| MODEL NO. | ○○ |
| DATE OF MEASUREMENT | ○○ |
| MEASURER | ○○ |

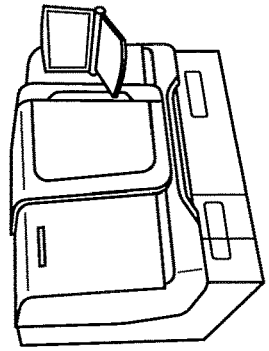

| | | | MEASUREMENT VALUE | NORMAL RANGE | ASSESSMENT | COMMENTS |
| --- | --- | --- | --- | --- | --- | --- |
| SPINDLE | NO. OF REVOLUTIONS | 1000 | | | | |
| | | VIBRATION LEVEL | 50 | 45~55 | A | FALLS WITHIN NORMAL RANGE |
| | | CHANGE OF TEMPERATURE | 10 | 4~13 | A | FALLS WITHIN NORMAL RANGE |
| | | 2000 | | | | |
| | | VIBRATION LEVEL | 60 | 50~60 | B | BEARING IS OBSERVED TO HAVE SLIGHT DEGRADATION |
| | | CHANGE OF TEMPERATURE | 10 | 5~15 | A | FALLS WITHIN NORMAL RANGE |
| X AXIS | ACCELERATION LOAD | | 10 | 8~12 | A | FALLS WITHIN NORMAL RANGE |
| | DECELERATION LOAD | | 10 | 8~12 | A | FALLS WITHIN NORMAL RANGE |
| | BACKLASH | | 5 | 0~3 | C | BACKLASH IS INCREASED. ASK FOR RE-ADJUSTMENT OF CORRECTION AGAINST BACKLASH |
| ... | ... | | ... | ... | ... | |

| ITEMS | NAMES OF ITEMS IN INFORMATION PROCESSING DEVICE | UNIT | NOTES |
|---|---|---|---|
| DATE OF ISSUANCE OF ALARM | DATE OF ISSUANCE OF ALARM | DATE | |
| TIME OF ISSUANCE OF ALARM | TIME OF ISSUANCE OF ALARM | TIME | |
| ALARM NO. | ALARM NO. | CHARACTERS | |
| ALARM MESSAGE | CONTENTS OF ALARM | CHARACTERS | |
| PROGRAM IN OPERATION | STATE IN OPERATION | ON/OFF | TURNED ON WHEN PROGRAM IS IN OPERATION |
| SPINDLE IN ROTATION | SPINDLE IN ROTATION | ON/OFF | TURNED ON WHEN SPINDLE IS IN ROTATION |
| ALARM CURRENTLY ISSUED | ALARM CURRENTLY ISSUED | ON/OFF | TURNED ON WHEN ALARM IS ISSUED |
| POWERED ON | POWERED ON | ON/OFF | TURNED ON WHEN POWERED ON |
| COOLANT | COOLANT | ON/OFF | CONSOLE PANEL INFORMATION |
| SINGLE BLOCK | SINGLE BLOCK | ON/OFF | CONSOLE PANEL INFORMATION |
| OPTIONAL STOP | OPTIONAL STOP | ON/OFF | CONSOLE PANEL INFORMATION |
| BLOCK DELETE | BLOCK DELETE | ON/OFF | CONSOLE PANEL INFORMATION |
| DRY RUN | DRY RUN | ON/OFF | CONSOLE PANEL INFORMATION |
| CURRENTLY FED FOR CUTTING | CURRENTLY FED FOR CUTTING | ON/OFF | TURNED ON WHEN FED FOR CUTTING |
| MANUAL MODE | MANUAL MODE | ON/OFF | CONSOLE PANEL INFORMATION |
| MODE | MODE | NUMERICAL VALUE | CONSOLE PANEL INFORMATION |
| SEQUENCE NO. | SEQUENCE NO. | NUMERICAL VALUE | INFORMATION FROM PROGRAM |
| SPINDLE'S REV | SPINDLE'S REV | NUMERICAL VALUE | NC INFORMATION (CURRENT VALUE) |
| TOOL NO. | TOOL NO. | NUMERICAL VALUE | NC INFORMATION (CURRENT VALUE) |
| SPINDLE LOAD INFORMATION | SPINDLE LOAD INFORMATION | NUMERICAL VALUE | NC INFORMATION (CURRENT VALUE) |
| 1ST AXIS LOAD INFORMATION | 1ST AXIS LOAD INFORMATION | NUMERICAL VALUE | NC INFORMATION (CURRENT VALUE) |
| 2ND AXIS LOAD INFORMATION | 2ND AXIS LOAD INFORMATION | NUMERICAL VALUE | NC INFORMATION (CURRENT VALUE) |
| 3RD AXIS LOAD INFORMATION | 3RD AXIS LOAD INFORMATION | NUMERICAL VALUE | NC INFORMATION (CURRENT VALUE) |
| DATE OF START OF PROCESSING | DATE OF START OF PROCESSING | DATE | |
| TIME OF START OF PROCESSING | TIME OF START OF PROCESSING | TIME | |
| DATE OF END OF PROCESSING | DATE OF END OF PROCESSING | DATE | |
| TIME OF END OF PROCESSING | TIME OF END OF PROCESSING | TIME | |
| PROGRAM NO. | PROGRAM NO. | CHARACTERS | INFORMATION FROM PROGRAM |
| SPINDLE OVERRIDE | SPINDLE OVERRIDE | NUMERICAL VALUE | CONSOLE PANEL INFORMATION |
| FEED OVERRIDE | CUTTING OVERRIDE | NUMERICAL VALUE | CONSOLE PANEL INFORMATION |
| FAST FORWARD OVERRIDE | FAST FORWARD OVERRIDE | NUMERICAL VALUE | CONSOLE PANEL INFORMATION |
| MACRO VARIABLE VALUE | MACRO VARIABLE VALUE | NUMERICAL VALUE | NC INFORMATION (CURRENT VALUE) |
| 1ST AXIS COORDINATE | 1ST AXIS COORDINATE | NUMERICAL VALUE | NC INFORMATION (CURRENT VALUE) |
| 2ND AXIS COORDINATE | 2ND AXIS COORDINATE | NUMERICAL VALUE | NC INFORMATION (CURRENT VALUE) |
| 3RD AXIS COORDINATE | 3RD AXIS COORDINATE | NUMERICAL VALUE | NC INFORMATION (CURRENT VALUE) |
| NO. OF LINES OF PROGRAM | NO. OF LINES OF PROGRAM | NUMERICAL VALUE | NC INFORMATION (CURRENT VALUE) |
| FEED RATE | FEED RATE | NUMERICAL VALUE | NC INFORMATION (CURRENT VALUE) |
| CUMULATIVE ENERGIZATION TIME | CUMULATIVE ENERGIZATION TIME | SECONDS | CUMULATIVE TIME WHILE POWERED ON |
| CUMULATIVE OPERATIONAL TIME | CUMULATIVE OPERATIONAL TIME | SECONDS | CUMULATIVE TIME WHILE IN OPERATION |
| CUMULATIVE ALARM ISSUANCE TIME | CUMULATIVE ALARM ISSUANCE TIME | SECONDS | CUMULATIVE TIME WHILE ALARM IS ISSUED |
| CUMULATIVE CUTTING TIME | CUMULATIVE CUTTING TIME | SECONDS | CUMULATIVE TIME WHILE BEING FED FOR CUTTING |
| CUMULATIVE SPINDLE ROTATION TIME | CUMULATIVE SPINDLE ROTATION TIME | SECONDS | CUMULATIVE TIME WHILE SPINDLE IS IN ROTATION |
| CUMULATIVE MANUAL MODE TIME | CUMULATIVE MANUAL MODE TIME | SECONDS | CUMULATIVE TIME OF MANUAL MODE |
| CUMULATIVE COOLANT DISCHARGING TIME | CUMULATIVE COOLANT DISCHARGING TIME | SECONDS | CUMULATIVE TIME WHILE COOLANT IS ACTUALLY DISCHARGED (NOT CONSOLE PANEL INFORMATION) |
| TIME HAVING ELAPSED SINCE BATTERY WAS REPLACED | BATTERY REPLACEMENT & INSPECTION: CUMULATIVE TIME | NUMERICAL VALUE | INFORMATION ON PERIODICAL MAINTENANCE SCREEN (TIME HAVING ELAPSED SINCE REPLACEMENT) |
| INTERVAL OF REPLACEMENT OF BATTERY | BATTERY REPLACEMENT & INSPECTION: INSPECTION TIME | NUMERICAL VALUE | INFORMATION ON PERIODICAL MAINTENANCE SCREEN (THRESHOLD VALUE TO ENCOURAGE REPLACEMENT (DIFFERENT FOR EACH MODEL TYPE)) |
| DATE OF REPLACEMENT OF BATTERY | BATTERY REPLACEMENT & INSPECTION: FINAL INSPECTION DATE | NUMERICAL VALUE | INFORMATION ON PERIODICAL MAINTENANCE SCREEN (DATE OF INSPECTION) |
| NO. OF TIMES OF APC | NO. OF TIMES OF APC | NO. OF TIMES | HIDDEN SCREEN INFORMATION FOR PERIODICAL MAINTENANCE (CUMULATIVE) |
| NO. OF TIMES OF ATC | NO. OF TIMES OF ATC | NO. OF TIMES | HIDDEN SCREEN INFORMATION FOR PERIODICAL MAINTENANCE (CUMULATIVE) |
| HOW MANY TIMES CHUCK IS OPENED/CLOSED 1 | HOW MANY TIMES CHUCK IS OPENED/CLOSED 1 | NO. OF TIMES | HIDDEN SCREEN INFORMATION FOR PERIODICAL MAINTENANCE (CUMULATIVE) |
| HOW MANY TIMES CHUCK IS OPENED/CLOSED 2 | HOW MANY TIMES CHUCK IS OPENED/CLOSED 2 | NO. OF TIMES | HIDDEN SCREEN INFORMATION FOR PERIODICAL MAINTENANCE (CUMULATIVE) |
| HOW MANY TIMES FRONT DOOR IS LOCKED 1 | HOW MANY TIMES FRONT DOOR IS LOCKED 1 | NO. OF TIMES | HIDDEN SCREEN INFORMATION FOR PERIODICAL MAINTENANCE (CUMULATIVE) |
| HOW MANY TIMES FRONT DOOR IS LOCKED 2 | HOW MANY TIMES FRONT DOOR IS LOCKED 2 | NO. OF TIMES | HIDDEN SCREEN INFORMATION FOR PERIODICAL MAINTENANCE (CUMULATIVE) |
| CUMULATIVE MILLING TIME 1 | MILLING 1 | SECONDS | HIDDEN SCREEN INFORMATION FOR PERIODICAL MAINTENANCE (CUMULATIVE) |
| CUMULATIVE MILLING TIME 2 | MILLING 2 | SECONDS | HIDDEN SCREEN INFORMATION FOR PERIODICAL MAINTENANCE (CUMULATIVE) |
| CUMULATIVE MILLING TIME 3 | MILLING 3 | SECONDS | HIDDEN SCREEN INFORMATION FOR PERIODICAL MAINTENANCE (CUMULATIVE) |
| SERVO CUMULATIVE TRAVELED DISTANCE (HEAD1-X) | SERVO CUMULATIVE TRAVELED DISTANCE (HEAD1-X) | M | HIDDEN SCREEN INFORMATION FOR PERIODICAL MAINTENANCE (CUMULATIVE) |
| SERVO CUMULATIVE TRAVELED DISTANCE (HEAD1-Y) | SERVO CUMULATIVE TRAVELED DISTANCE (HEAD1-Y) | M | HIDDEN SCREEN INFORMATION FOR PERIODICAL MAINTENANCE (CUMULATIVE) |
| SERVO CUMULATIVE TRAVELED DISTANCE (HEAD1-Z) | SERVO CUMULATIVE TRAVELED DISTANCE (HEAD1-Z) | M | HIDDEN SCREEN INFORMATION FOR PERIODICAL MAINTENANCE (CUMULATIVE) |
| SERVO CUMULATIVE TRAVELED DISTANCE (HEAD2-X) | SERVO CUMULATIVE TRAVELED DISTANCE (HEAD2-X) | M | HIDDEN SCREEN INFORMATION FOR PERIODICAL MAINTENANCE (CUMULATIVE) |
| SERVO CUMULATIVE TRAVELED DISTANCE (HEAD2-Y) | SERVO CUMULATIVE TRAVELED DISTANCE (HEAD2-Y) | M | HIDDEN SCREEN INFORMATION FOR PERIODICAL MAINTENANCE (CUMULATIVE) |
| SERVO CUMULATIVE TRAVELED DISTANCE (HEAD2-Z) | SERVO CUMULATIVE TRAVELED DISTANCE (HEAD2-Z) | M | HIDDEN SCREEN INFORMATION FOR PERIODICAL MAINTENANCE (CUMULATIVE) |
| SPINDLE ROTATION TIME 1 | SPINDLE ROTATION TIME 1 | SECONDS | HIDDEN SCREEN INFORMATION FOR PERIODICAL MAINTENANCE (CUMULATIVE) |
| SPINDLE ROTATION TIME 2 | SPINDLE ROTATION TIME 2 | SECONDS | HIDDEN SCREEN INFORMATION FOR PERIODICAL MAINTENANCE (CUMULATIVE) |
| HOW MANY TIMES TABLE IS INDEXED | HOW MANY TIMES TABLE IS INDEXED | NO. OF TIMES | HIDDEN SCREEN INFORMATION FOR PERIODICAL MAINTENANCE (CUMULATIVE) |
| MILLING CUMULATIVE REV. 1 | MILLING INTEGRAL REV. 1 | NO. OF TIMES | HIDDEN SCREEN INFORMATION FOR PERIODICAL MAINTENANCE (CUMULATIVE) |
| MILLING CUMULATIVE REV. 2 | MILLING INTEGRAL REV. 2 | NO. OF TIMES | HIDDEN SCREEN INFORMATION FOR PERIODICAL MAINTENANCE (CUMULATIVE) |
| MILLING CUMULATIVE REV. 3 | MILLING INTEGRAL REV. 3 | NO. OF TIMES | HIDDEN SCREEN INFORMATION FOR PERIODICAL MAINTENANCE (CUMULATIVE) |
| SPINDLE CUMULATIVE REV. 1 | SPINDLE INTEGRAL REV. 1 | NO. OF TIMES | HIDDEN SCREEN INFORMATION FOR PERIODICAL MAINTENANCE (CUMULATIVE) |
| SPINDLE CUMULATIVE REV. 2 | SPINDLE INTEGRAL REV. 2 | NO. OF TIMES | HIDDEN SCREEN INFORMATION FOR PERIODICAL MAINTENANCE (CUMULATIVE) |
| HOW MANY TIMES TURRET IS INDEXED 1 | HOW MANY TIMES TURRET IS INDEXED 1 | NO. OF TIMES | HIDDEN SCREEN INFORMATION FOR PERIODICAL MAINTENANCE (CUMULATIVE) |
| HOW MANY TIMES TURRET IS INDEXED 2 | HOW MANY TIMES TURRET IS INDEXED 2 | NO. OF TIMES | HIDDEN SCREEN INFORMATION FOR PERIODICAL MAINTENANCE (CUMULATIVE) |
| HOW MANY TIMES TURRET IS INDEXED 3 | HOW MANY TIMES TURRET IS INDEXED 3 | NO. OF TIMES | HIDDEN SCREEN INFORMATION FOR PERIODICAL MAINTENANCE (CUMULATIVE) |
| SPINDLE WINDING SWITCHING 1 | SPINDLE WINDING SWITCHING 1 | NO. OF TIMES | HIDDEN SCREEN INFORMATION FOR PERIODICAL MAINTENANCE (CUMULATIVE) |
| SPINDLE WINDING SWITCHING 2 | SPINDLE WINDING SWITCHING 2 | NO. OF TIMES | HIDDEN SCREEN INFORMATION FOR PERIODICAL MAINTENANCE (CUMULATIVE) |
| SPINDLE WINDING SWITCHING 3 | SPINDLE WINDING SWITCHING 3 | NO. OF TIMES | HIDDEN SCREEN INFORMATION FOR PERIODICAL MAINTENANCE (CUMULATIVE) |
| SPINDLE WINDING SWITCHING 4 | SPINDLE WINDING SWITCHING 4 | NO. OF TIMES | HIDDEN SCREEN INFORMATION FOR PERIODICAL MAINTENANCE (CUMULATIVE) |
| HOW MANY TIMES MAGAZINE IS INDEXED | | NO. OF TIMES | |

US 11,897,068 B2

INFORMATION PROCESSING METHOD, INFORMATION PROCESSING SYSTEM, AND INFORMATION PROCESSING DEVICE

TECHNICAL FIELD

The present disclosure relates to a technique for collecting a variety of types of information from a plurality of machine tools.

BACKGROUND ART

Various techniques relating to machine tools have been developed. For example, Japanese Patent No. 5992087 (Patent Literature 1) discloses a preventive maintenance management system capable of predicting a failure of a machine tool.

As another example, International Publication No. 2002/003156 (Patent Literature 2) discloses a NC (numerical control)-machining supporting system which connects machine tools to a central management device via a network and is capable of mutually communicating various types of information between each NC machine tool and the central management device. The central management device collects processing know-how etc. of each machine tool from the NC machine tool, for example.

As yet another example, International Publication No. 2000/012259 (Patent Literature 3) discloses a tool management system capable of creating tool information for a machine tool. During processing by the machine tool, the tool management system accumulates actual cutting data associated with a variety of types of information of a tool used, NC command information, tool correction information, and spindle load information, and feeds them back.

As yet another example, Japanese Patent Application Laying-Open No. 2003-177815 (Patent Literature 4) discloses a preventive maintenance system for an industrial machine allowing an efficient maintenance operation to be performed by a user provided with maintenance information from a manufacturer. The preventive maintenance system for an industrial machine includes: an information transmission unit for connecting, whenever necessary, a LAN on the user side and a LAN on a manufacturer side through a communication line; a monitor unit connected to the LAN on the user side for monitoring predetermined items of the industrial machine; an information transmission/reception unit for transmitting the monitor information obtained by the monitor unit to the LAN on the manufacturer side through the information transmission unit, and for receiving information from the LAN on the manufacturer side; a supervisory unit connected to the LAN on the manufacturer side for automatically diagnosing a fault based on the monitor information received, and for automatically supervising the industrial machine; and a preventive maintenance information transmission unit for automatically transmitting preventive maintenance information to the user side when maintenance is necessary based on a diagnosis result.

CITATION LIST

Patent Literature

PTL 1: Japanese Patent No. 5992087
PTL 2: WO 2002/003156
PTL 3: WO 2000/012259
PTL 4: Japanese Patent Laying-Open No. 2003-177815

SUMMARY OF INVENTION

Technical Problem

Technology capable of collecting information about various machine tools from the machine tools has been developed. However, as machine tools are diversified, collectable information is also enormous in type and amount, and it is now a problem that collected information is not effectively utilized. Therefore, a technique for effectively utilizing a variety of types of information collected from machine tools is desired.

Patent Literature 1 does not disclose what type of information is collected or how the information is utilized. Patent Literature 2 and Patent Literature 3 merely disclose collecting information based on actual processing data and do not disclose any other method for collecting or using information. Patent Literature 4 merely discloses collecting monitoring information of predetermined items of the industrial machine and does not disclose any other method for collecting or using information.

The present disclosure has been made to solve the above-described problems, and an object in an aspect is to provide an information processing method capable of effectively utilizing a variety of types of information collected from a machine tool. An object in another aspect is to provide an information processing system capable of effectively utilizing a variety of types of information collected from a machine tool. It is an object to provide an information processing device capable of effectively utilizing a variety of types of information collected from a machine tool.

Solution to Problem

According to one aspect, an information processing method comprises the step of communicating with a plurality of machine tools. The plurality of machine tools each include a sensor to sense information about the machine tool as sensed information. The step of communicating includes the step of receiving as collected data from each of the plurality of machine tools part information about a part of the machine tool and the sensed information obtained by the sensor. The information processing method further comprises the steps of: storing in a storage unit the collected data received from each of the plurality of machine tools; and based on the plurality of collected data stored in the storage unit, learning a correlation between part information of a machine tool and sensed information obtained by the sensor internal to that machine tool.

According to another aspect, an information processing method comprises the step of communicating with a plurality of machine tools. The step of communicating includes the step of receiving as collected data from each of the plurality of machine tools content of an alarm issued in the machine tool and a method performed for the machine tool to handle the alarm when the alarm is issued. The information processing method further comprises the steps of: storing in a storage unit the collected data received from each of the plurality of machine tools; and based on the plurality of collected data stored in the storage unit, learning for each type of the alarm a correlation between the alarm and the method performed to handle the alarm.

According to another aspect, an information processing method comprises the step of communicating with a plurality of machine tools. The plurality of machine tools each include a sensor to sense information about the machine tool as sensed information, and a recommending function for recommending a candidate for a recommended condition for a control parameter for reducing vibration of a spindle of the machine tool. The step of communicating includes the step of receiving as collected data from each of the plurality of machine tools the sensed information obtained by the sensor, a recommended condition selected from such candidates, and a result indicating whether the vibration is reduced by setting for the machine tool a control parameter corresponding to the recommended condition. The information processing method further comprises the steps of: storing in a storage unit the collected data received from each of the plurality of machine tools; and based on the plurality of collected data stored in the storage unit, learning a correlation among sensed information obtained by the sensor internal to a machine tool, a recommended condition selected from the candidates, and the result.

According to another aspect, an information processing method comprises the step of communicating with a plurality of machine tools. The plurality of machine tools each include a sensor to sense information about the machine tool as sensed information, and an interface for connecting to a correction device for correcting a control parameter for the machine tool. The step of communicating includes the step of receiving as collected data from each of the plurality of machine tools the sensed information obtained by the sensor and correction information of the control parameter corrected by the correction device. The information processing method further comprises the steps of: storing in a storage unit the collected data received from each of the plurality of machine tools; and based on the plurality of collected data stored in the storage unit, learning a correlation between sensed information obtained by the sensor internal to a machine tool and correction information provided by the correction device.

According to another aspect, an information processing method comprises the step of communicating with a plurality of machine tools. The plurality of machine tools each include a plurality of sensors to sense different types of information about the machine tool. The step of communicating includes the step of receiving as collected data from each of the plurality of machine tools sensed information obtained by each of the plurality of sensors internal to the machine tool. The information processing method further comprises the steps of: storing in a storage unit the collected data received from each of the plurality of machine tools; based on the plurality of collected data stored in the storage unit, learning a normal range for sensed information for each of types of the plurality of sensors; when an instruction is received from any of the plurality of machine tools and other machine tools to conduct a diagnosis, receiving from that machine tool sensed information obtained by the plurality of sensors internal to the machine tool, and referring to a learning result obtained through the step of learning to make a diagnosis of whether each of the sensed information received falls within a normal range corresponding thereto; and transmitting the diagnosis to the machine tool that has issued the instruction.

According to another aspect, an information processing system comprises an information processing device, and a plurality of machine tools capable of communicating with the information processing device. The plurality of machine tools each include a sensor to sense information about the machine tool as sensed information. The information processing device includes: a communication unit configured to receive as collected data from each of the plurality of machine tools part information about a part of the machine tool and the sensed information obtained by the sensor; a storage unit configured to store the collected data received from each of the plurality of machine tools; and a learning unit configured to learn, based on the plurality of collected data stored in the storage unit, a correlation between part information of a machine tool and sensed information obtained by the sensor internal to that machine tool.

According to another aspect, an information processing device comprises a communication unit configured to communicate with a plurality of machine tools. The plurality of machine tools each include a sensor to sense information about the machine tool as sensed information. The communication unit receives as collected data from each of the plurality of machine tools part information about a part of the machine tool and the sensed information obtained by the sensor. The information processing device further comprises a storage unit configured to store the collected data received from each of the plurality of machine tools, and a learning unit configured to learn, based on the plurality of collected data stored in the storage unit, a correlation between part information of a machine tool and sensed information obtained by the sensor internal to that machine tool.

Advantageous Effect of Invention

In one aspect, a variety of types of information collected from a machine tool can be effectively utilized.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram showing an example of a data structure of a database according to the first embodiment.

FIG. 4 is a diagram showing an example of a correlation obtained as a learning result.

FIG. 5 is a diagram showing an example of a database according to a modified example.

FIG. 13 is a diagram showing an example of a data structure of a database according to the second embodiment.

FIG. 18 is a diagram showing an example of a learning result as obtained through a learning process done by the information processing device according to the sixth embodiment.

FIG. 19 is a diagram showing an example of a diagnosis result screen displayed on a display of a machine tool according to a seventh embodiment.

FIG. 21 is a diagram showing an example of collected data collected from a machine tool by an information processing device according to an eighth embodiment.

DESCRIPTION OF EMBODIMENTS

Hereinafter, each embodiment according to the present invention will be described with reference to the drawings. In the following description, identical parts and components are identically denoted. Their names and functions are also identical. Accordingly, they will not be described repeatedly in detail. It should be noted that each embodiment and each modification described below may be selectively combined as appropriate.

First Embodiment

[System Configuration of Information Processing System 1]

Figure 1:
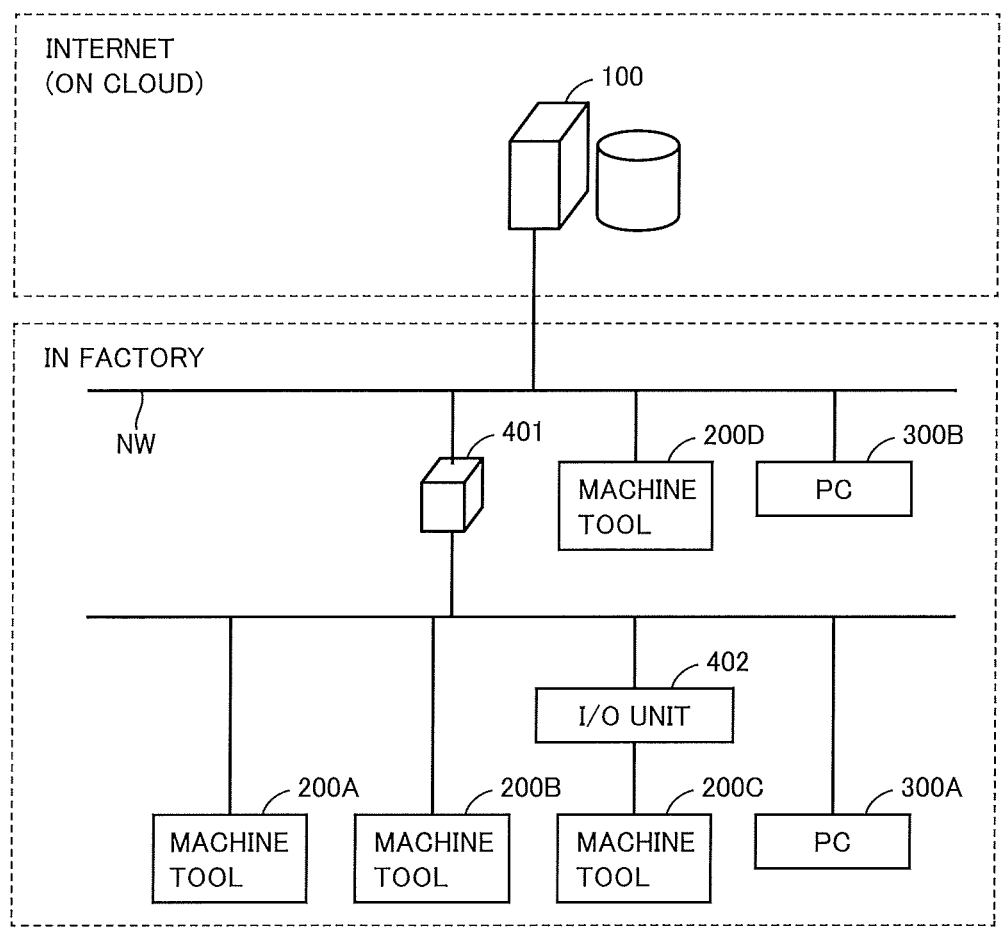
FIG. 1 is a diagram showing an example of a system configuration of an information processing system according to a first embodiment.

With reference to FIG. 1, an information processing system 1 for collecting information about a machine tool will be described. FIG. 1 is a diagram showing an example of a system configuration of information processing system 1.

Information processing system 1 includes an information processing device 100 and a plurality of machine tools 200A to 200D.

Machine tools 200A to 200D are disposed, for example, in a factory. Machine tools 200A to 200D may be identical or different in type. Hereinafter, at least one of machine tools 200A to 200D will also be referred to as a machine tool 200.

A type of machine tool 200 is for example a lathe or a machining center. A lathe processes a workpiece by applying a tool to the workpiece while turning the workpiece by a spindle. A machining center processes a workpiece by applying a tool to the workpiece while turning the tool by a spindle.

Information processing device 100 is a server installed at a location different from the factory where machine tools 200A to 200D are installed. Information processing device 100 collects various pieces of information about machine tools 200A to 200D from the machine tools and makes a database of the information. As an example, information processing device 100 collects a spindle's acceleration as sensed by an acceleration sensor, a machine tool's internal temperature as sensed by a temperature sensor, information about a hydraulic unit in the machine tool, a result of monitoring an oil cooler, and the like. These pieces of information are collected by a function, which may be a physical server, and may for example be provided in a platform on the cloud.

Information processing device 100 and machine tool 200 are connected to each other via a network NW. Machine tool 200 is connected to network NW in any manner. In the example of FIG. 1, machine tools 200A and 200B are connected to network NW via a router 401. Machine tool 200C is connected to network NW via an IO (input/output) unit and router 401. Machine tool 200D is directly connected to network NW.

In addition to information processing device 100 and machine tool 200, information processing system 1 may include PCs (personal computers) 300A and 300B. PC 300A is indirectly networked to information processing device 100 via router 401. PC 300B is directly networked to information processing device 100.

[Learning Process by Information Processing Device 100]

Figure 2:
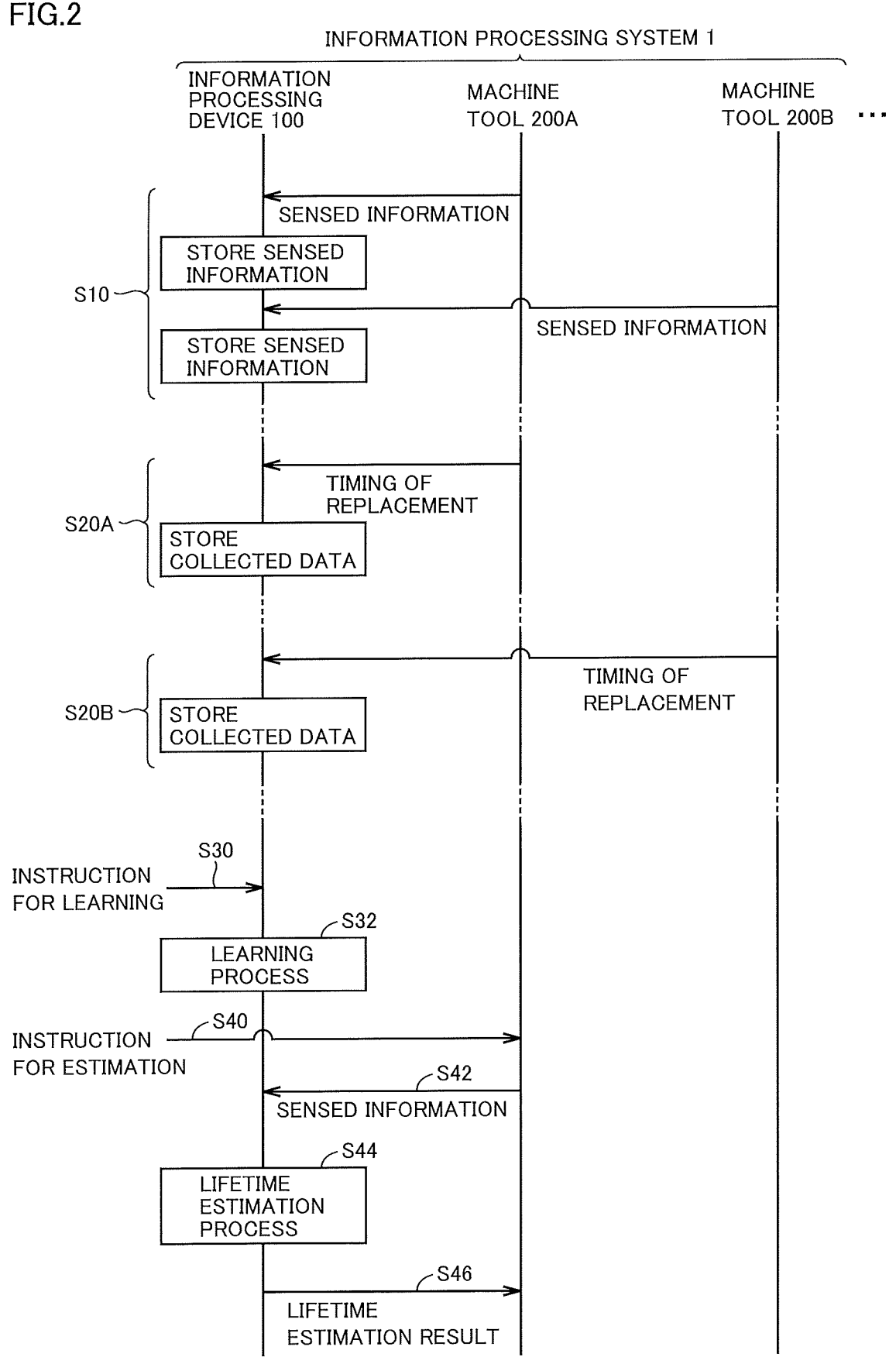
FIG. 2 is a sequence diagram showing a flow of data between an information processing device and a machine tool according to the first embodiment.

A learning process by information processing device 100 will be described with reference to FIGS. 2 to 4. FIG. 2 is a sequence diagram showing a flow of data between information processing device 100 and machine tools 200A, 200B.

Each machine tool 200 includes a sensor to sense information about the machine tool per se. In the present embodiment, information processing device 100 collects from each of machine tools 200 part information about a part of machine tool 200 to be maintained, and sensed information obtained by a sensor internal to machine tool 200. Subsequently, based on the information collected from each of machine tools 200, information processing device 100 learns, through machine-learning (or data-mining), a correlation between the part information of machine tool 200 and the sensed information obtained by the sensor internal to machine tool 200. Information processing device 100 refers to the correlation obtained as a learning result to predict a lifetime for the part to be maintained, determines whether the part to be maintained has a defect, and the like.

More specifically, in step S10, information processing device 100 periodically receives from machine tool 200A sensed information obtained by the sensor internal to machine tool 200A. The sensed information received has imparted thereto a time at which the information is sensed, and information processing device 100 receives the sensed information as a history of sensing. Similarly, information processing device 100 periodically receives from machine tool 200B sensed information obtained by a sensor internal to machine tool 200B. The sensed information received has imparted thereto a time at which the information is sensed, and information processing device 100 receives the sensed information as a history of sensing. The histories of sensing received from machine tools 200A and 200B are stored in a database 124, which will be described later.

In step S20A, it is assumed that a part of machine tool 200A to be maintained is replaced. The part to be maintained includes expendables such as a spindle, for example. Based on the part to be maintained having been replaced with another, machine tool 200A transmits to information processing device 100 as part information a part ID (identification) for identifying the part to be maintained that is a target for replacement and the timing of replacing the part to be maintained. Information processing device 100 associates the part information received from machine tool 200A with the sensed information of machine tool 200A as received in step S10 before the timing of replacing the part to be maintained, and then stores these pieces of information in database 124 shown in FIG. 3.

FIG. 3 is a diagram showing an example of a data structure of database 124. In the example of FIG. 3, a machine tool's device ID, a history of sensing (that is, the sensed information and the timing of sensing the information) received in step S10, and item information received in step S20A are associated with one another. The sensed information to be collected for example includes: temperature inside machine tool 200A as sensed by a temperature sensor; power consumption in machine tool 200A; acceleration of the spindle of machine tool 200A as sensed by an acceleration sensor; a value of a current flowing through a part to be maintained in machine tool 200A, as sensed by a current sensor; and the like. The item information to be collected includes, for example, a part ID for identifying a part to be maintained that is a target for replacement, and a timing of replacing the part to be maintained.

Similarly in step S20B, it is assumed that a part of machine tool 200B to be maintained is replaced. Machine tool 200B transmits to information processing device 100 as part information a part ID for identifying the part to be maintained that is a target for replacement and the timing of replacing the part to be maintained. Information processing device 100 associates the part information received from machine tool 200B with the sensed information of machine tool 200B as received in step S10 before the timing of replacing the part to be maintained, and then stores these pieces of information in database 124 shown in FIG. 3.

In this way, information processing device 100 receives as collected data from each of machine tools 200 item information about a part to be maintained that is a target for replacement and sensed information obtained by a sensor before the timing of replacing the part to be maintained. Information processing device 100 stores in database 124 the collected data received from each of machine tools 200. As a result, collected data 125A to 125H is accumulated in database 124.

In step S30, information processing device 100 receives a learning instruction for the sake of illustration. The learning instruction may be issued based on a user operation done to information processing device 100 or may be issued as a preset timing of learning has arrived.

In step S32, information processing device 100 executes a learning process for machine-learning a correlation between the collected data accumulated in database 124. In the present embodiment, information processing device 100 learns, based on database 124, through machine-learning, a correlation between a timing of replacing a part of machine tool 200 to be maintained and sensed information obtained by a sensor internal to machine tool 200.

More specifically, information processing device 100 calculates for each of collected data 125A to 125H a period of time from a timing of sensing sensed information to a timing of replacing a part to be maintained (hereinafter also referred to as a "lifetime"). Thereafter, information processing device 100 learns, through machine-learning, a correlation between each sensed information indicated in database 124 and a lifetime calculated for each sensed information, by type of part to be maintained. Various learning methods such as a neural network and a support vector machine can be adopted for machine-learning the correlation.

FIG. 4 is a diagram showing an example of a correlation 126 obtained as a learning result. In the example of FIG. 4, correlation 126 obtained as a learning result for a part "1" to be maintained in machine tool 200 is shown. The horizontal axis for correlation 126 represents sensed information obtained by a sensor internal to machine tool 200. In the example of FIG. 4, while the sensed information is represented in one dimension for convenience of explanation, the sensed information may be represented by a number of dimensions corresponding to the type of the sensed information. The vertical axis for correlation 126 represents the lifetime of part "1" to be maintained.

In step S40, machine tool 200A receives an instruction from a user to estimate the lifetime of part "1" to be maintained for the sake of illustration. In response, machine tool 200A outputs a sensing instruction to its internal sensor and obtains new sensed information from the sensor.

In step S42, machine tool 200A transmits the new sensed information to information processing device 100.

In step S44, in response to having received the new sensed information obtained by the sensor of machine tool 200A, information processing device 100 refers to correlation 126 learned in step S32 and thus determines a lifetime corresponding to the received new sensed information as a result of estimating the lifetime of part "1" to be maintained. For example, when information processing device 100 receives sensed information "m1" from machine tool 200A, information processing device 100 estimates a lifetime "ΔT" corresponding to the sensed information "m1" as the lifetime of part "1" to be maintained. The estimated lifetime is output in any manner. As an example, the estimated lifetime may be output as a message on a screen or may be output audibly. For example, a message such as "Lifetime will expire in about 10 hours" is displayed. This allows service personnel or a user to recognize the lifetime of a part to be maintained. As another example, when information processing device 100 receives sensed information "m2" from machine tool 200A, information processing device 100 estimates a lifetime of "0" corresponding to the sensed information "m2" as the lifetime of part "1" to be maintained. That is, in that case, it is determined that the lifetime of part "1" to be maintained has expired.

In step S46, information processing device 100 transmits to machine tool 200A the lifetime estimation result obtained in step S44. Machine tool 200A receives the lifetime estimation result from information processing device 100 and outputs the same. The lifetime estimation result is output in any manner. As an example, the lifetime estimation result may be output on a screen or audibly or may cause an order to be automatically issued to a manufacturer for a spare part or a request to be issued for maintenance.

While in the examples of FIGS. 2 and 3 an example has been described in which a timing of replacing a part to be maintained is collected as part information of machine tool 200, other part information may be collected. For example, a timing of a failure of a part of machine tool 200 to be maintained may be collected. In that case, information processing device 100 collects from each machine tool 200 part information including a timing of a failure of a part of machine tool 200 to be maintained and sensed information obtained by a sensor before the timing of the failure of the part to be maintained. Subsequently, based on the collected data, information processing device 100 learns, through machine-learning, a correlation between the timing of the failure of the part of the machine tool to be maintained and the sensed information obtained by the sensor internal to that machine tool. Thereafter, when new sensed information is received from machine tool 200, information processing device 100 refers to the correlation obtained as a learning result to specify a timing of a failure of the part to be maintained that corresponds to the received new sensed information. Based on the specified timing of the failure, information processing device 100 determines a timing of replacing the part to be maintained.

Further, as part information of machine tool 200, an impurity level (or contamination) of a coolant of machine tool 200 may be sensed. In that case, information processing device 100 collects from each of machine tools 200 part information including a level of impurity of the coolant and sensed information obtained by the sensor (for example, temperature, the coolant's hydraulic pressure, and the like). Subsequently, based on the collected data, information processing device 100 learns, through machine-learning, a correlation between the coolant's impurity level and the sensed information obtained by the sensor. Thereafter, when new sensed information is received from machine tool 200, information processing device 100 refers to the correlation obtained as a learning result to sense the coolant's impurity level corresponding to the received new sensed information.

[Modification]

FIG. 5 is a diagram showing an example of a database 124A according to a modified example. In database 124 shown in FIG. 3, sensed information obtained by the sensor internal to machine tool 200 and part information about a part to be maintained have been collected. In contrast, in database 124A according to the modified example, operation information indicating an operation status of machine tool 200 is further collected.

More specifically, information processing device 100 collects sensed information obtained by machine tool 200, part information of machine tool 200, and operation information of machine tool 200 from each of machine tools 200. The operation information for example includes a traveling distance, the spindle's operation time, a power supply's state (ON or OFF) an issued alarm, and the like.

When performing the learning process, information processing device 100 refers to database 124A to learn a correlation between the sensed information obtained by machine tool 200, the part information of machine tool 200, and the operation information of machine tool 200 through machine-learning for each type of part to be maintained.

Other operation information may be collected. For example, information of a failure of a cylinder of an automatic door of machine tool 200, how many times the automatic door is opened/closed, when the automatic door is opened/closed, alarm information related to the automatic door, model type, and the like may be collected as the other operation information. In that case, from information of replacing the cylinder of the automatic door, the operation information, and the model type information, information processing device 100 can estimate an alarm before the door cylinder fails.

[Functional Configuration of Information Processing Device 100]

Figure 6:
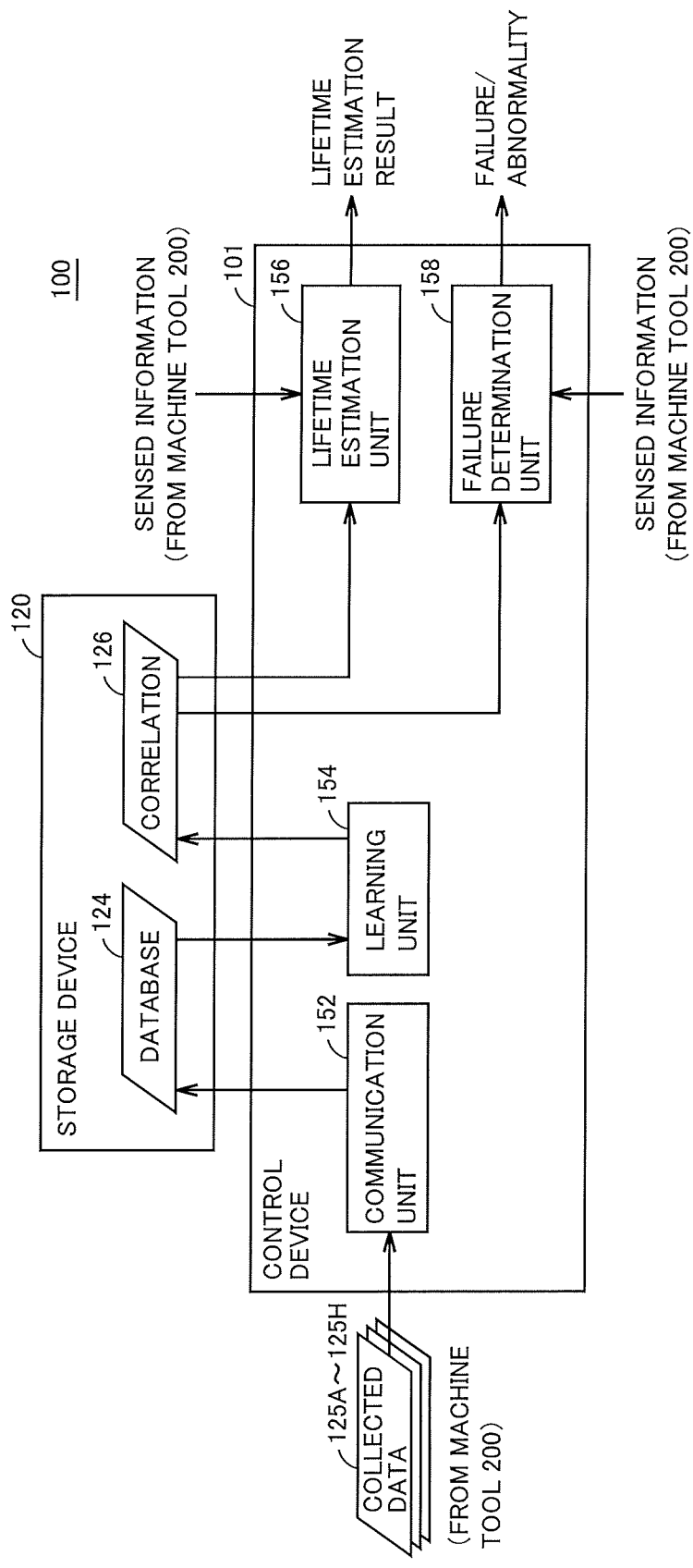
FIG. 6 is a diagram showing an example of a functional configuration of the information processing device according to the first embodiment.

With reference to FIG. 6, a function of information processing device 100 will be described. FIG. 6 is a diagram showing an example of a functional configuration of information processing device 100.

As shown in FIG. 6, information processing device 100 includes a control device 101 and a storage device 120 (a storage unit) as a hardware configuration. Control device 101 includes a communication unit 152, a learning unit 154, a lifetime estimation unit 156, and a failure determination unit 158 as a functional configuration.

Communication unit 152 receives as collected data from each of machine tools 200 part information about a part of machine tool 200 to be maintained and sensed information obtained by a sensor internal to machine tool 200. The collected data received is successively stored in database 124 (see FIG. 3) stored in storage device 120.

Based on the collected data accumulated in database 124, learning unit 154 learns, through machine-learning, correlation 126 (see FIG. 4) between the part information of machine tool 200 and the sensed information obtained by the sensor internal to machine tool 200.

In one aspect, a timing of replacing a part of machine tool 200 to be maintained and sensed information obtained by a sensor internal to machine tool 200 are collected in database 124. Learning unit 154 refers to database 124 to learn, through machine-learning, a correlation between the timing of replacing the part of machine tool 200 to be maintained and the sensed information obtained by the sensor internal to machine tool 200.

In another aspect, a timing of a failure of a part of machine tool 200 to be maintained and sensed information obtained by a sensor internal to machine tool 200 are collected in database 124. Learning unit 154 refers to database 124 to learn, through machine-learning, a correlation between the timing of the failure of the part of machine tool 200 to be maintained and the sensed information obtained by the sensor internal to machine tool 200.

When new sensed information is received from machine tool 200, lifetime estimation unit 156 refers to correlation 126 to specify for each part of machine tool 200 to be maintained a timing of replacement corresponding to the sensed information received. Based on the specified timing of replacement, lifetime estimation unit 156 estimates a lifetime of each part to be maintained.

When new sensed information is received from machine tool 200, failure determination unit 158 refers to correlation 126 to specify for each part of machine tool 200 to be maintained a timing of replacement corresponding to the sensed information received. Based on the specified timing of replacement, failure determination unit 158 determines failure of each part to be maintained.

[Control Structure of Information Processing Device 100]

Figure 7:
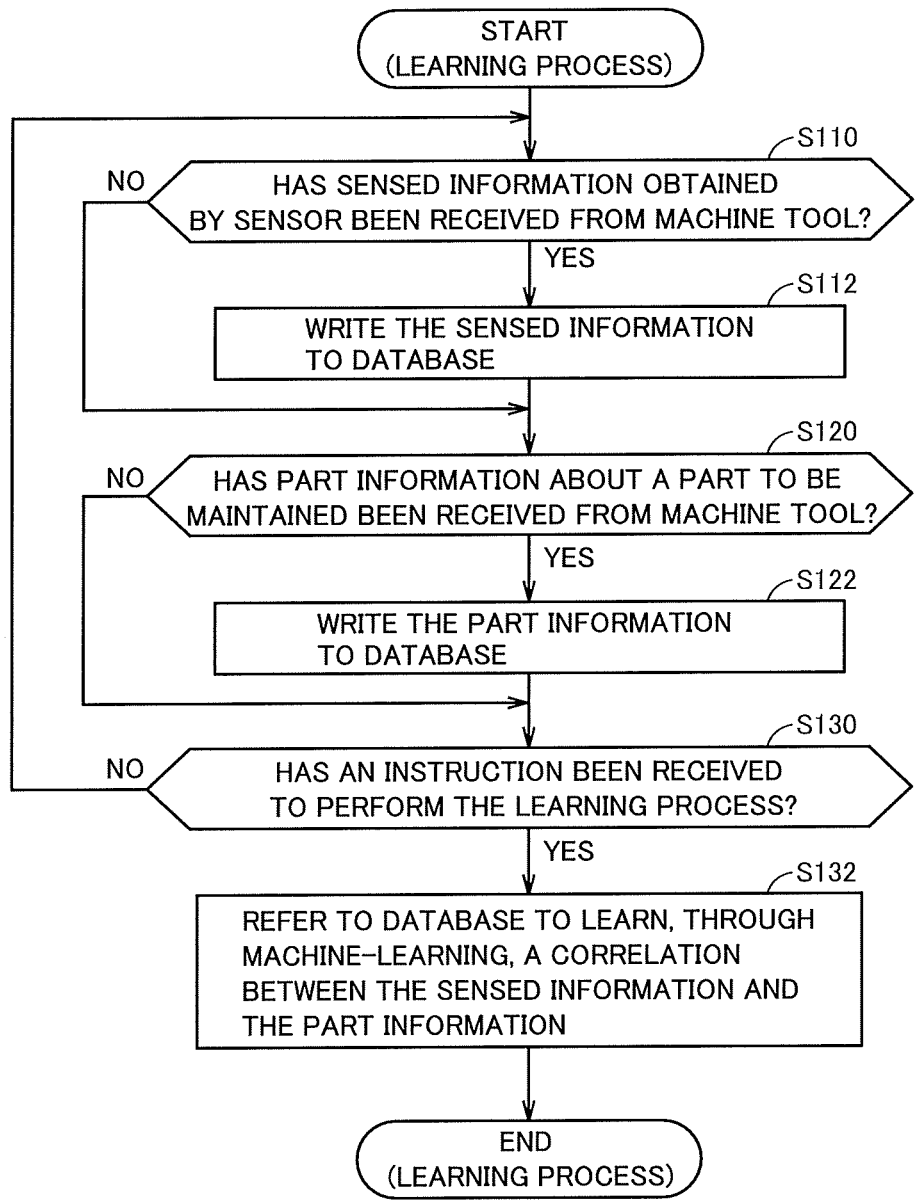
FIG. 7 is a flowchart representing a learning process performed by the information processing device according to the first embodiment.
Figure 8:
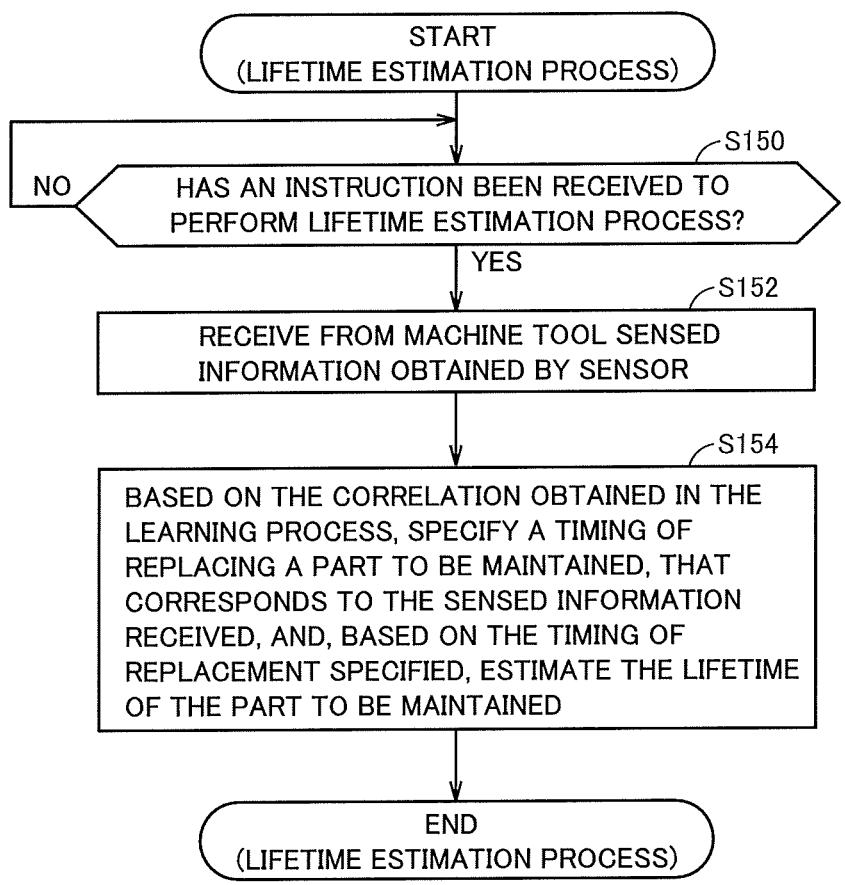
FIG. 8 is a flowchart representing a process performed by the information processing device according to the first embodiment for estimating a lifetime of a part to be maintained.

A control structure of information processing device 100 will be described with reference to FIGS. 7 and 8. FIG. 7 is a flowchart representing a learning process performed by information processing device 100. FIG. 8 is a flowchart representing a process performed by information processing device 100 for estimating a lifetime of a part to be maintained. The processes in FIGS. 7 and 8 are implemented by information processing device 100's control device 101 executing a program. In another aspect, the processes may partially or entirely be performed by a circuit element or other hardware.

Typically, control device 101 initially performs the learning process shown in FIG. 7, and thereafter performs the lifetime estimation process shown in FIG. 8. Hereinafter, the learning process shown in FIG. 7 and the lifetime estimation process shown in FIG. 8 will be described in order.

(Learning Process)

Referring to FIG. 7, in step S110, control device 101 determines whether sensed information obtained by the sensor of machine tool 200 has been received from machine tool 200. When control device 101 determines that the sensed information obtained by the sensor of machine tool 200 has been received from machine tool 200 (YES in step S110), control device 101 proceeds to step S112. Otherwise (NO in step S110), control device 101 proceeds to step S120.

In step S112, control device 101, as communication unit 152 (see FIG. 6), writes to database 124 (see FIG. 3) the sensed information received from machine tool 200 in step S110. Sensed information to be collected for example includes: temperature inside machine tool 200 as sensed by a temperature sensor; power consumption in machine tool 200A; acceleration of the spindle of machine tool 200A as sensed by an acceleration sensor; a value of a current flowing through a part to be maintained in machine tool 200A, as sensed by a current sensor; and the like.

In step S120, control device 101 determines whether part information about a part to be maintained has been received from machine tool 200. When control device 101 determines that part information about a part to be maintained has been received from machine tool 200 (YES in step S120), control device 101 proceeds to step S122. Otherwise (NO in step S120), control device 101 proceeds to step S130.

In step S122, control device 101, as communication unit 152, writes to database 124 (see FIG. 3) the part information received from machine tool 200 in step S110. Part information to be collected includes, for example, a timing of replacing a part to be maintained, a part ID for identifying the part to be maintained, and the like.

In step S130, control device 101 determines whether an instruction has been received to perform the learning process. The instruction may be issued based on a user operation done to information processing device 100 or machine tool 200 or may be issued as a preset timing of learning has arrived. When control device 101 determines that an instruction to perform the learning process has been received from the user (YES in step S130), control device 101 proceeds to step S132. Otherwise (NO in step S130), control device 101 returns to step S110.

In step S132, control device 101, as learning unit 154 (see FIG. 6), learns, through machine-learning, a correlation between the sensed information and part information accumulated in database 124. As a result, by way of example, correlation 126 described above is obtained.

(Lifetime Estimation Process)

With reference to FIG. 8, the process for estimating a lifetime of a part to be maintained will be described.

In step S150, control device 101 determines whether an instruction has been received to perform the lifetime estimation process. The instruction may be issued based on a user operation done to information processing device 100 or machine tool 200 or may be issued as a preset timing of learning has arrived. When control device 101 determines that an instruction to perform the lifetime estimation process has been received (YES in step S150), control device 101 proceeds to step S152. Otherwise (NO in step S150), control device 101 performs step S150 again.

In step S152, control device 101 transmits a sensing instruction to machine tool 200 that is a target for estimation of lifetime. In response to the sensing instruction received from information processing device 100, machine tool 200 obtains sensed information obtained by the sensor internal to machine tool 200. Machine tool 200 transmits the obtained sensed information to information processing device 100.

In step S154, control device 101, as lifetime estimation unit 156 (see FIG. 6), specifies, based on the correlation obtained in the learning process shown in FIG. 7, a timing of replacing a part to be maintained, that corresponds to the sensed information received in step S152. Based on the timing of replacement specified, control device 101 estimates the lifetime of the part to be maintained. The lifetime estimation process is as has been described with reference to FIG. 4, and accordingly, will not be described repeatedly.

[Hardware Configuration of Information Processing Device 100]

Figure 9:
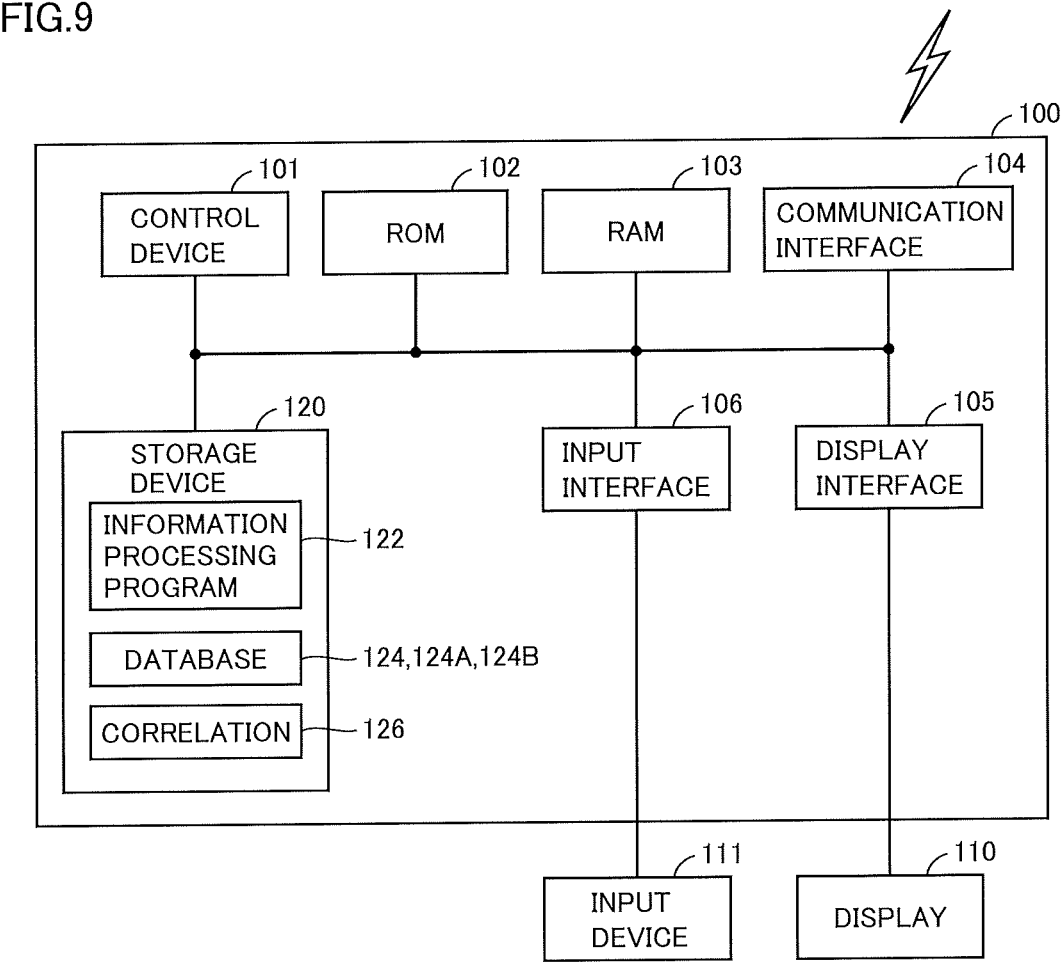
FIG. 9 is a block diagram showing a main hardware configuration of the information processing device according to the first embodiment.

An example of a hardware configuration of information processing device 100 will be described with reference to FIG. 9. FIG. 9 is a block diagram showing a main hardware configuration of information processing device 100.

Information processing device 100 includes a control device 101, a ROM (Read Only Memory) 102, a RAM (Random Access Memory) 103, a communication interface 104, a display interface 105, an input interface 106, and storage device 120.

Control device 101 controls information processing device 100. Control device 101 is composed for example of at least one integrated circuit. The integrated circuit is configured for example by at least one CPU (central processing unit), at least one ASIC (application specific integrated circuit), at least one FPGA (field programmable gate array) or a combination thereof, or the like.

Control device 101 controls an operation of information processing device 100 by executing various programs such as an information processing program 122 according to the present embodiment. Control device 101 reads information processing program 122 from storage device 120 into ROM 102 in response to an instruction received to execute information processing program 122. RAM 103 functions as a working memory and temporarily stores various data necessary for executing information processing program 122.

To communication interface 104, a LAN, an antenna, and the like are connected. Information processing device 100 communicates data with an external communication device via communication interface 104. The external communication device includes, for example, machine tool 200, a server, other communication terminals, and the like. Information processing device 100 may be configured to be capable of downloading information processing program 122 from the server.

Display interface 105 is connected to a display 110 and sends an image signal to display 110 in accordance with a command issued from control device 101 or the like for displaying an image. Display 110 is, for example, a liquid crystal display, an organic EL display, or other display devices. Display 110 for example displays a result of estimating a lifetime of a part of machine tool 200 to be maintained, a result of determining whether the part to be maintained has failure, and the like.

Input interface 106 is, for example, a USB (universal serial bus) terminal and is connected to an input device 111. Input interface 106 receives a signal indicating a user operation from input device 111. Input device 111 is, for example, a mouse, a keyboard, a touch panel, or any other device that can receive the user's operations. For a blade server constituting the cloud, it is unnecessary to include input interface 106 and display interface 105.

Storage device 120 is, for example, a storage medium such as a hard disk or a flash memory. Storage device 120 stores information processing program 122 according to the present embodiment, database 124 (see FIG. 3), correlation 126 (see FIG. 4), and the like. Where information processing program 122, database 124, and correlation 126 are stored is not limited to storage device 120, and may be stored in a storage area (for example, cache memory or the like) of control device 101, ROM 102, RAM 103, an external device (e.g., machine tool 200), or the like.

It should be noted that information processing program 122 may not be a single program and may instead be incorporated in a part of any program and thus provided. In that case, a process according to the present embodiment is implemented in cooperation with that program. Even such a program that does not include some module does not depart from the gist of information processing program 122 according to the present embodiment. Furthermore, a function provided by information processing program 122 may partially or entirely be implemented by dedicated hardware. Further, information processing device 100 and machine tool 200 may cooperate to execute information processing program 122.

[Hardware Configuration of Machine Tool 200]

Figure 10:
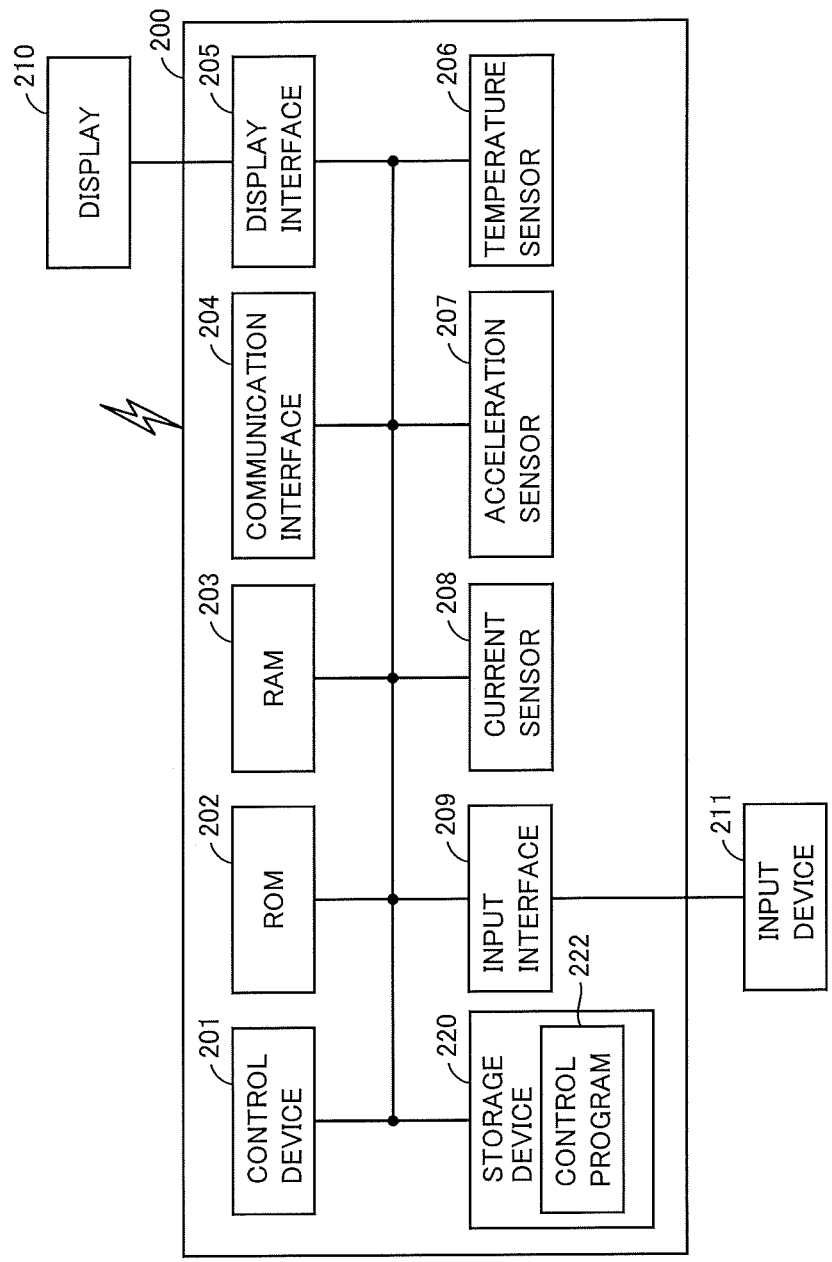
FIG. 10 is a block diagram showing a main hardware configuration of a machine tool according to the first embodiment.

An example of a hardware configuration of machine tool 200 will be described with reference to FIG. 10. FIG. 10 is a block diagram showing a main hardware configuration of machine tool 200.

Machine tool 200 includes a control device 201, a ROM 202, a RAM 203, a communication interface 204, a display interface 205, a temperature sensor 206, an acceleration sensor 207, a current sensor 208, an input interface 209, and a storage device 220.

Control device 201 controls machine tool 200. Control device 201 is constituted by, for example, at least one integrated circuit. The integrated circuit is constituted by, for example, at least one CPU, at least one ASIC, at least one FPGA, a combination thereof, or the like.

Control device 201 controls an operation of machine tool 200 by executing various programs such as a control program 222 for machine tool 200. Control device 201 reads control program 222 from storage device 220 into ROM 202 in response to an instruction received to execute control program 222. RAM 203 functions as a working memory and temporarily stores various data necessary for executing control program 222.

To communication interface 204, a LAN, an antenna, and the like are connected. Machine tool 200 communicates data with an external communication device via communication interface 204. The external communication device includes, for example, information processing device 100, other communication terminals, and the like. Machine tool 200 may be configured to be capable of downloading control program 222 from the communication terminal.

Display interface 205 is connected to a display 210 and sends an image signal to display 210 in accordance with a command issued from control device 201 or the like for displaying an image. Display 210 is, for example, a liquid crystal display, an organic EL display, or other display devices.

Temperature sensor 206 is provided in machine tool 200 and senses the temperature of a part to be maintained. Temperature sensor 206 periodically senses the temperature of the part to be maintained and transmits the sensed temperature to information processing device 100 via communication interface 204 as sensed information.

Acceleration sensor 207 is provided in machine tool 200 and senses acceleration (or vibration) of a part to be maintained. As an example, acceleration sensor 207 senses acceleration of the spindle of machine tool 200. The sensed acceleration is transmitted as sensed information to information processing device 100 via communication interface 204.

Current sensor 208 is provided in machine tool 200 and senses the value of a current flowing through a part to be maintained. Current sensor 208 periodically senses the value of the current flowing through the part to be maintained and transmits the sensed current's value as sensed information to information processing device 100 via communication interface 204.

Input interface 209 is, for example, a USB terminal and is connected to an input device 211. Input interface 209 receives a signal indicating a user operation from input device 211. Input device 211 is, for example, a mouse, a keyboard, a touch panel, or any other device that can receive user operations.

Storage device 220 is, for example, a storage medium such as a hard disk or a flash memory. Storage device 220 stores control program 222 and the like according to the present embodiment. Where control program 222 is stored is not limited to storage device 220, and may be stored in a storage area (for example, cache memory or the like) of control device 201, ROM 202, RAM 203, an external device (e.g., information processing device 100), or the like.

Second Embodiment

[Outline]

Information processing device 100 according to the first embodiment collects sensed information obtained by a sensor internal to machine tool 200 and part information about a part to be maintained in machine tool 200. In contrast, information processing device 100 according to a second embodiment collects an alarm issued in machine tool 200 and a method for handling the alarm. Subsequently, information processing device 100 learns, through machine-learning, by type of alarm, a correlation between the alarm issued in machine tool 200 and the method for handling the alarm.

The remainder of information processing device 100 according to the second embodiment is the same as that of information processing device 100 according to the first embodiment, and accordingly, will not be described repeatedly.

[Learning Process by Information Processing Device 100]

Figure 11:
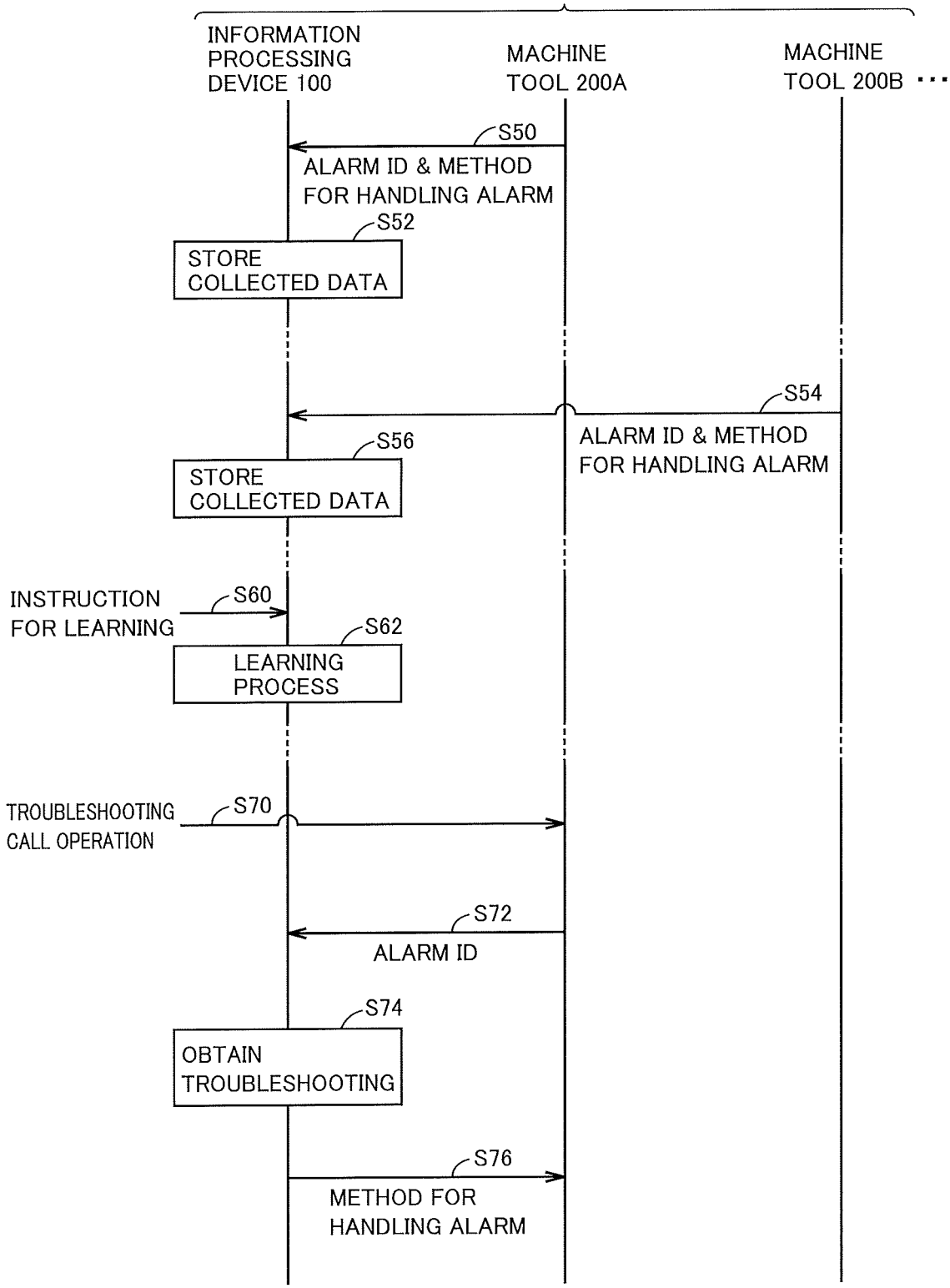
FIG. 11 is a sequence diagram showing a flow of data between the information processing device and a machine tool according to a second embodiment.

A learning process by information processing device 100 according to the second embodiment will be described with reference to FIGS. 11-13. FIG. 11 is a sequence diagram showing a flow of data between information processing device 100 and machine tools 200A, 200B according to the second embodiment.

In step S50, it is assumed that an alarm to be sensed is issued in machine tool 200A. Service personnel or a user operates machine tool 200A to handle the alarm issued for machine tool 200A. Subsequently, the service personnel or user inputs to a screen of machine tool 200A content of a failure of machine tool 200A and a method for handling the failure.

Figure 12:
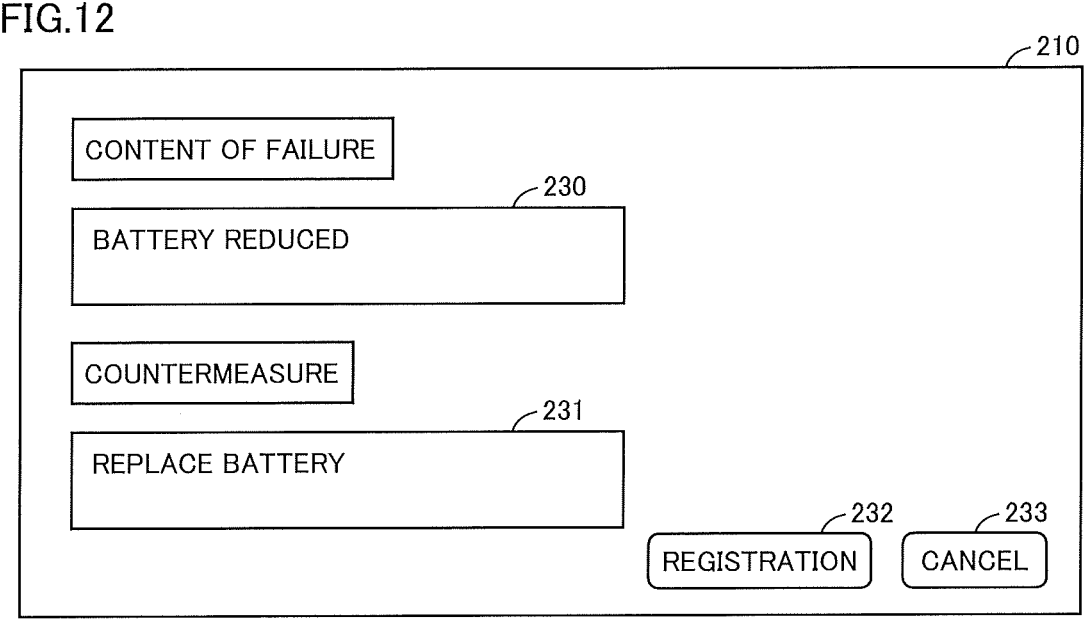
FIG. 12 is a diagram showing an example of a screen displayed on a display of a machine tool according to the second embodiment.

FIG. 12 is a diagram showing an example of a screen displayed on display 210 of machine tool 200A. The screen shown in FIG. 12 is provided from an operating system referred to as "CELOS," for example. The screen includes, for example, an input area 230 for inputting content of a failure, an input area 231 for inputting a method for handling the failure, a registration button 232, and a cancel button 233. When registration button 232 is pressed, the issued alarm's ID and information input to input areas 230 and 231 are transmitted to information processing device 100. When cancel button 233 is pressed, the screen shown in FIG. 12 is closed.

In step S52, information processing device 100 associates the alarm ID received from machine tool 200A with the method for handling the alarm, and then stores these pieces of information in a database 124B shown in FIG. 13. FIG.

13 is a diagram showing an example of a data structure of database 124B. In the example of FIG. 13, a machine tool's device ID, an alarm ID for identifying an alarm issued in the machine tool, the time at which the alarm is issued, and a method for handling the alarm are associated with one another by type of alarm.

In step S54, it is assumed that an alarm to be sensed is issued in machine tool 200B. Service personnel or a user operates machine tool 200B to handle the alarm issued in machine tool 200B. Subsequently, similarly as has been set forth above, the service personnel or user inputs to a screen of machine tool 200E content of a failure of machine tool 200B and a method for handling the failure. Machine tool 200B transmits to information processing device 100 an alarm ID for identifying the alarm issued, the time at which the alarm is issued, and the method for handling the alarm.

In step S56, information processing device 100 associates the alarm ID received from machine tool 200B with the method for handling the alarm, and then stores these pieces of information in database 124B by type of alarm.

By repeating steps S50, S52, S54 and S56, collected data 125I to 125P are accumulated in database 124B.

In step S60, information processing device 100 receives a learning instruction from the user for the sake of illustration. The learning instruction may be issued based on a user operation done to information processing device 100 or may be issued as a preset timing of learning has arrived.

In step S62, based on collected data 125I to 125P of database 124B, information processing device 100 learns, through machine-learning, a correlation between the alarm and the method for handling the alarm, by type of alarm. Various learning methods such as a neural network and a support vector machine can be adopted for machine-learning the correlation.

In step S70, it is assumed that an alarm is further issued in machine tool 200A and the user performs a troubleshooting call operation for handling the alarm.

In step S72, machine tool 200A transmits an alarm ID to information processing device 100 for identifying the issued alarm.

In step S74, in response to the alarm ID received from machine tool 200A, information processing device 100 refers to the correlation learned in step S62 and thus obtains a method for handling the received alarm ID as troubleshooting.

In step S76, information processing device 100 transmits the method obtained in step S74 to machine tool 200A. Machine tool 200A outputs the method received from information processing device 100 as troubleshooting. The troubleshooting may be output on a screen or may be audibly output.

Thus, once information processing device 100 has received a further alarm issued in machine tool 200A, information processing device 100 refers to the correlation learned in step S62 to determine a method for responding to the received alarm and output the determined method.

While in the above description an example in which an alarm ID and a handling method are collected has been described, other information may also be collected. For example, information processing device 100 may collect: tool information (for example, manufacturer, tool type, and the like); type of workpiece; cutting conditions (for example, the spindle's rotational speed, cutting width, cutting depth, feed, and the like); a variety of types of sensor information including acceleration (for example, frequency, peak oscillation, and the like) as main information; the machine tool's state (for example, a coordinate along each axis, axial load, and the like); and the like.

Third Embodiment

[Outline]

Information processing device 100 according to the first embodiment collects sensed information obtained by a sensor internal to machine tool 200 and part information about a part of machine tool 200 to be maintained. In contrast, information processing device 100 according to a third embodiment collects sensed information obtained by the sensor internal to machine tool 200 and information about a tool used in a machining process performed by machine tool 200.

The remainder of information processing device 100 according to the third embodiment is the same as that of information processing device 100 according to the first embodiment, and accordingly, will not be described repeatedly.

[System Configuration of Information Processing System 1]

Figure 14:
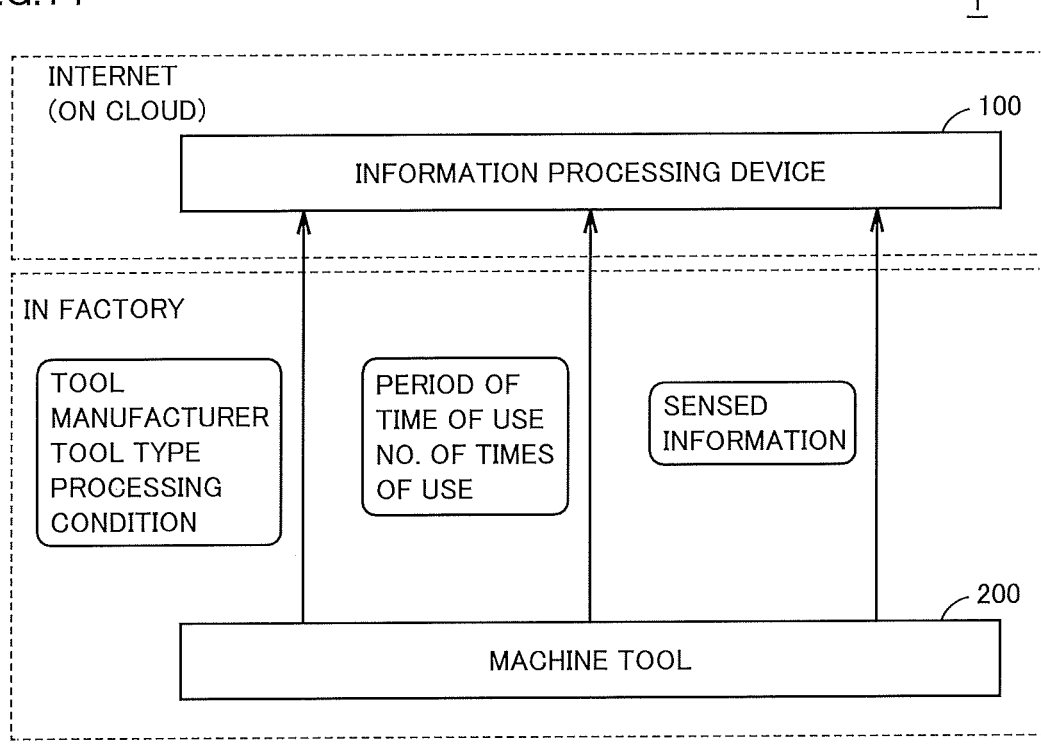
FIG. 14 is a diagram showing an example of a system configuration of an information processing system according to a third embodiment.

With reference to FIG. 14, information processing system 1 according to the third embodiment will be described. FIG. 14 is a diagram showing an example of a system configuration of information processing system 1 according to the third embodiment.

Information processing system 1 is composed of information processing device 100 and a plurality of machine tools 200s.

A tool for processing a workpiece can be attached to the spindle of machine tool 200. The tool attached on the spindle can be automatically changed in accordance with the type of the workpiece and the processing mode of interest. Information processing device 100 according to the present embodiment collects from various machine tools 200 tool information about a tool used in the process for processing a workpiece. As an example, information processing device 100 collects a tool manufacturer, a tool type (for example, a tool ID), a work processing condition, and the like from machine tool 200 as the tool information. In addition, information processing device 100 collects information of how long a tool is used, how many times the tool is used, and the like from machine tool 200 as the tool information. Further, information processing device 100 collects from machine tool 200 sensed information obtained by the sensor of machine tool 200 during the process for processing the workpiece. Information processing device 100 associates the tool information with the sensed information and thus stores the pieces of information in database 124.

Subsequently, based on the accumulated tool information and sensed information, information processing device 100 learns, through machine-learning, a correlation between the tool information and the sensed information. Preferably, the correlation is machine-learned by type of machine tool 200 and type of tool.

Information processing device 100 can thus distinguish a tool's lifetime, damage, etc. by type of tool.

Fourth Embodiment

[Outline]

Information processing device 100 according to the first embodiment collects sensed information obtained by a sensor internal to machine tool 200 and part information about a part of machine tool 200 to be maintained. In contrast, information processing device 100 according to a fourth embodiment collects sensed information obtained by the sensor internal to machine tool 200 and a control parameter set for machine tool 200.

The remainder of information processing device 100 according to the fourth embodiment is the same as that of information processing device 100 according to the first embodiment, and accordingly, will not be described repeatedly.

[System Configuration of Information Processing System 1]

Figure 15:
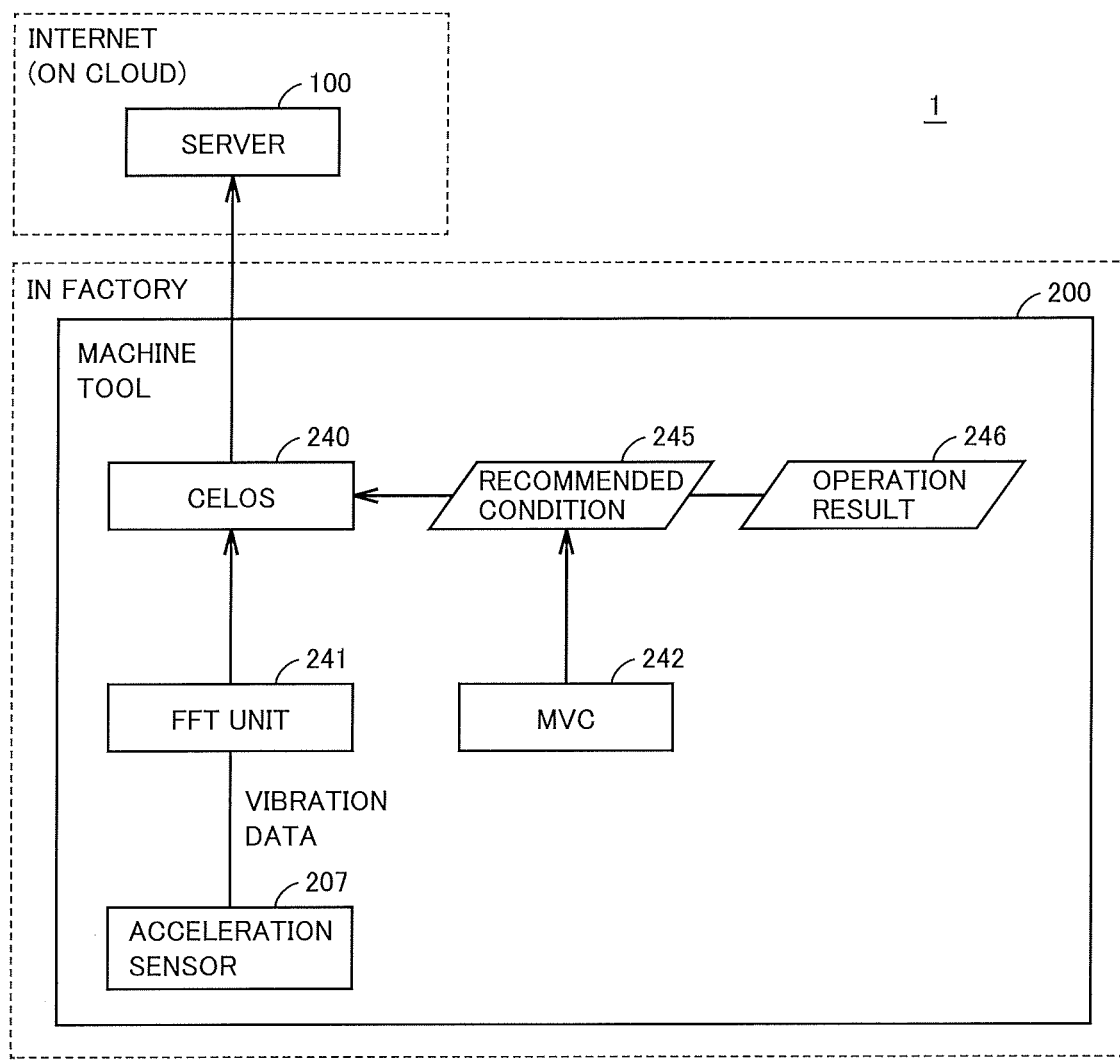
FIG. 15 is a diagram showing an example of a system configuration of an information processing system according to a fourth embodiment.

With reference to FIG. 15, information processing system 1 according to the fourth embodiment will be described. FIG. 15 is a diagram showing an example of a system configuration of information processing system 1 according to the fourth embodiment.

Information processing system 1 is composed of information processing device 100 and a plurality of machine tools 200s.

Machine tool 200 is, for example, the MVX5000 series manufactured by DMG MORI CO., LTD. Machine tool 200 according to the present embodiment has a recommending function for recommending a candidate control parameter to be set for machine tool 200 per se. As an example, a recommending function by an MVC (machine vibration control) manufactured by DMG MORI CO., LTD is adopted. In processing a workpiece, when unintended vibration (hereinafter also referred to as "chatter") occurs between a tool and the workpiece, the MVC automatically presents a recommended condition to a user for reducing the chatter. When any one of recommended conditions presented is selected, machine tool 200 sets a control parameter corresponding to the selected recommended condition. As a result, the control parameter is optimized and the chatter is alleviated.

Information processing device 100 according to the present embodiment collects from various machine tools 200 a recommended condition selected from those recommended by the MVC. More specifically, machine tool 200 includes CELOS 240 serving as an operating system, and CELOS 240 obtains from MVC 242 a condition 245 recommended by MVC 242 and an operation result 246 obtained as recommended condition 245 is adopted. Operation result 246 indicates whether chatter was reduced by adopting recommended condition 245, and it is expressed by, for example, by what percentage the chatter has successfully been reduced.

In parallel, acceleration sensor 207 obtains acceleration of the spindle of machine tool 200 as vibration data. An FFT (Fast Fourier Transform) unit 241 subjects to fast Fourier transform the vibration data obtained from acceleration sensor 207. As a result, the vibration data is subjected to frequency division. A result of the Fourier transform is output to CELOS 240.

CELOS 240 transmits sensed information obtained by acceleration sensor 207, recommended condition 245, and operation result 246 to information processing device 100. Information processing device 100 collects these pieces of information as collected data from various machine tools 200, associates the sensed information, recommended condition 245 and operation result 246 with one another, and thus stores these pieces of information in database 124.

Subsequently, information processing device 100 learns, through machine-learning, by type of operation result 246, a correlation among the accumulated sensed information, recommended condition 245, and operation result 246. Information processing device 100 can thus more precisely estimate a cutting condition or the like for reducing chatter, and thus allows more efficient cutting.

As has been described above, information processing device 100 receives as collected data from machine tool 200 sensed information obtained by acceleration sensor 207, recommended condition 245 selected from recommended candidates, and operation result 246 indicating whether chatter is reduced by setting for machine tool 200 a control parameter corresponding to recommended condition 245. Information processing device 100 accumulates in database 124 the collected data received from machine tool 200. Subsequently, based on the collected data accumulated in database 124, information processing device 100 learns, through machine-learning, a correlation among the sensed information obtained by acceleration sensor 207, recommended condition 245, and operation result 246.

While in the above description an example in which the sensed information obtained by acceleration sensor 207, recommended condition 245 and operation result 246 are collected has been described, other information may also be collected. For example, information processing device 100 may collect: tool information (for example, manufacturer, tool type, and the like); type of workpiece; cutting conditions (for example, the spindle's rotational speed, cutting width, cutting depth, feed, and the like); a variety of types of sensor information including acceleration (for example, frequency, peak oscillation, and the like) as main information; the machine tool's state (for example, a coordinate along each axis, axial load, and the like); and the like in the course of processing by using MVC 242.

Fifth Embodiment

[Outline]

Information processing device 100 according to the first embodiment collects sensed information obtained by a sensor internal to machine tool 200 and part information about a part of machine tool 200 to be maintained. In contrast, information processing device 100 according to a fifth embodiment collects sensed information obtained by the sensor internal to machine tool 200 and correction information of a control parameter set for machine tool 200.

The remainder of information processing device 100 according to the fifth embodiment is the same as that of information processing device 100 according to the first embodiment, and accordingly, will not be described repeatedly.

[System Configuration of Information Processing System 1]

Figure 16:
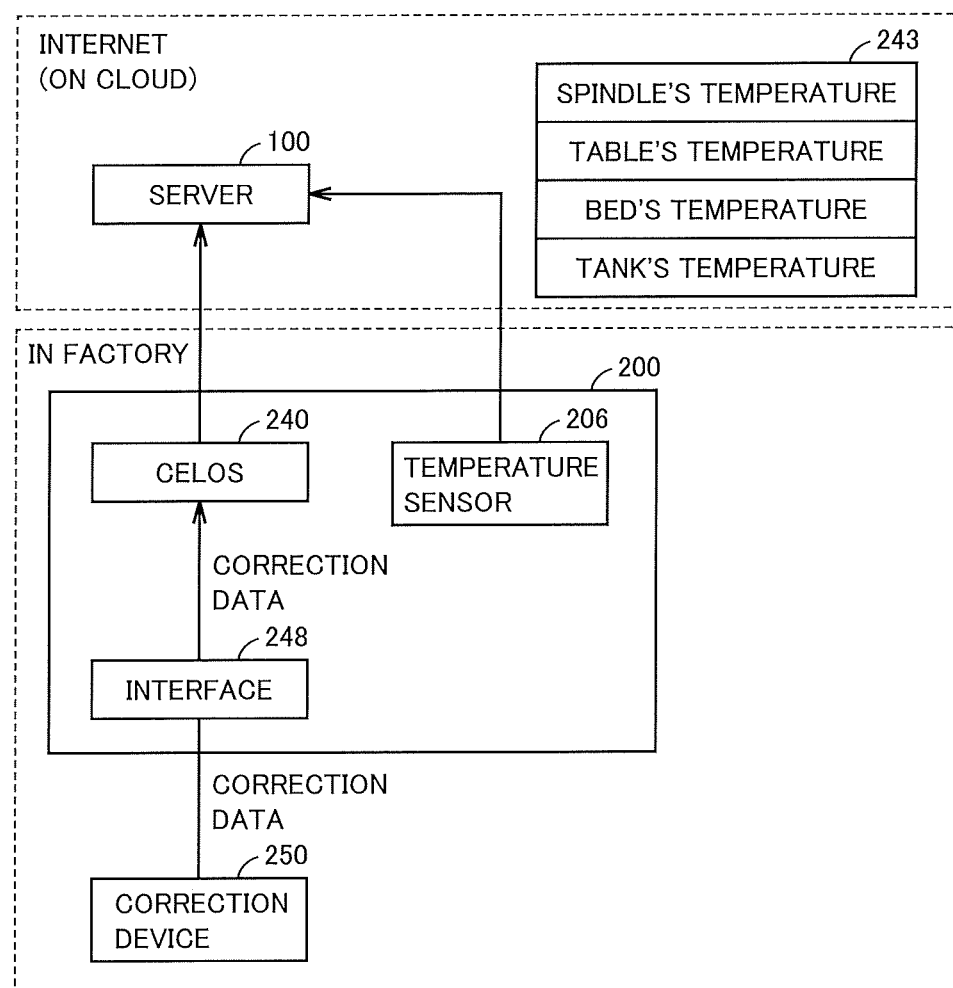
FIG. 16 is a diagram showing an example of a system configuration of an information processing system according to a fifth embodiment.

With reference to FIG. 16, information processing system 1 according to the fifth embodiment will be described. FIG. 16 is a diagram showing an example of a system configuration of information processing system 1 according to the fifth embodiment.

Information processing system 1 is composed of information processing device 100 and a plurality of machine tools 200s.

Machine tool 200 is, for example, the DMU series, the NTX series, or the like manufactured by DMG MORI CO., LID. Machine tool 200 according to the present embodiment includes an interface 248 for connecting a correction device 250 for correcting a control parameter for machine tool 200. As an example, correction device 250 is "3D Quick Set." "3D Quick Set" is a tool kit which measures a geometric intersection of a pivot axis using a touch probe and a true sphere and uses the measurement result to automatically correct an error of the spindle of machine tool 200, an error of the turning center of the table, and the like.

Information processing device 100 according to the present embodiment collects from various machine tools 200 correction information of a control parameter corrected by correction device 250. More specifically, machine tool 200 includes CELOS 240 serving as an operating system, and CELOS 240 obtains from correction device 250 via interface 248 the correction information of the control parameter corrected by correction device 250. CELOS 240 transmits to information processing device 100 the correction information obtained from correction device 250.

In parallel, temperature sensor 206 senses maintenance temperature of a component in machine tool 200. Preferably, temperature sensor 206 is provided for each component of a temperature sensing target. Temperature sensor 206 senses, for example, the temperature of the spindle, the temperature of a table for holding the workpiece, the temperature of a bed, the temperature of a tank, and the like. The temperature sensed by temperature sensor 206 is transmitted to information processing device 100 as sensed information 243.

Information processing device 100 collects sensed information 243 from temperature sensor 206 and the correction information from correction device 250 as collected data from various machine tools 200, associates the former information with the latter information, and thus accumulates these pieces of information in database 124. Subsequently, information processing device 100 learns, through machine-learning, a correlation between the sensed information and the correction information that are accumulated. Preferably, the correlation is machine-learned by type of machine tool 200 and type of part to be maintained. This allows information processing device 100 to build an algorithm that can estimate, before measurement, that an error is increasingly larger, based on the sensed information from the temperature sensor, and provide feedback to machine tool 200 accordingly. In addition, machine tool 200 can precisely predict deterioration in precision based on the sensed information from the temperature sensor, and can thus estimate a timing of using correction device 250.

As has been described above, information processing device 100 receives as collected data from various machine tools 200 sensed information obtained by temperature sensor 206 and correction information of a control parameter corrected by correction device 250. Information processing device 100 accumulates in database 124 the collected data received from machine tool 200. Subsequently, based on the collected data accumulated in database 124, information processing device 100 learns, through machine-learning, a correlation between the sensed information obtained by temperature sensor 206 and the correction information provided by correction device 250.

While in the above description an example in which sensed information obtained by temperature sensor 206 and correction information of a control parameter corrected by correction device 250 are collected has been described, other information may also be collected. For example, information processing device 100 may further collect operation information indicating an operation status of machine tool 200.

Sixth Embodiment

[Outline]

In order to prevent reduced productivity caused by a sudden failure, it is necessary for a user to periodically replace a part to be maintained or the like. In doing so, diagnosing whether the part to be maintained should be replaced requires a special knowledge and experience, and accordingly, the user needs to request maintenance personnel to diagnose the part to be maintained. Maintenance personnel may disassemble machine tool 200 and visually observe the part to be maintained, and accordingly, stop machine tool 200 for a long time. Furthermore, asking maintenance personnel to diagnose the part to be maintained also invites an increased cost. In order to solve these problems, information processing device 100 according to the present embodiment provides a function that allows the user himself/herself to periodically diagnose machine tool 200.

The remainder of information processing device 100 according to the sixth embodiment is the same as that of information processing device 100 according to the first embodiment, and accordingly, will not be described repeatedly.

[Diagnostic Process]

Figure 17:
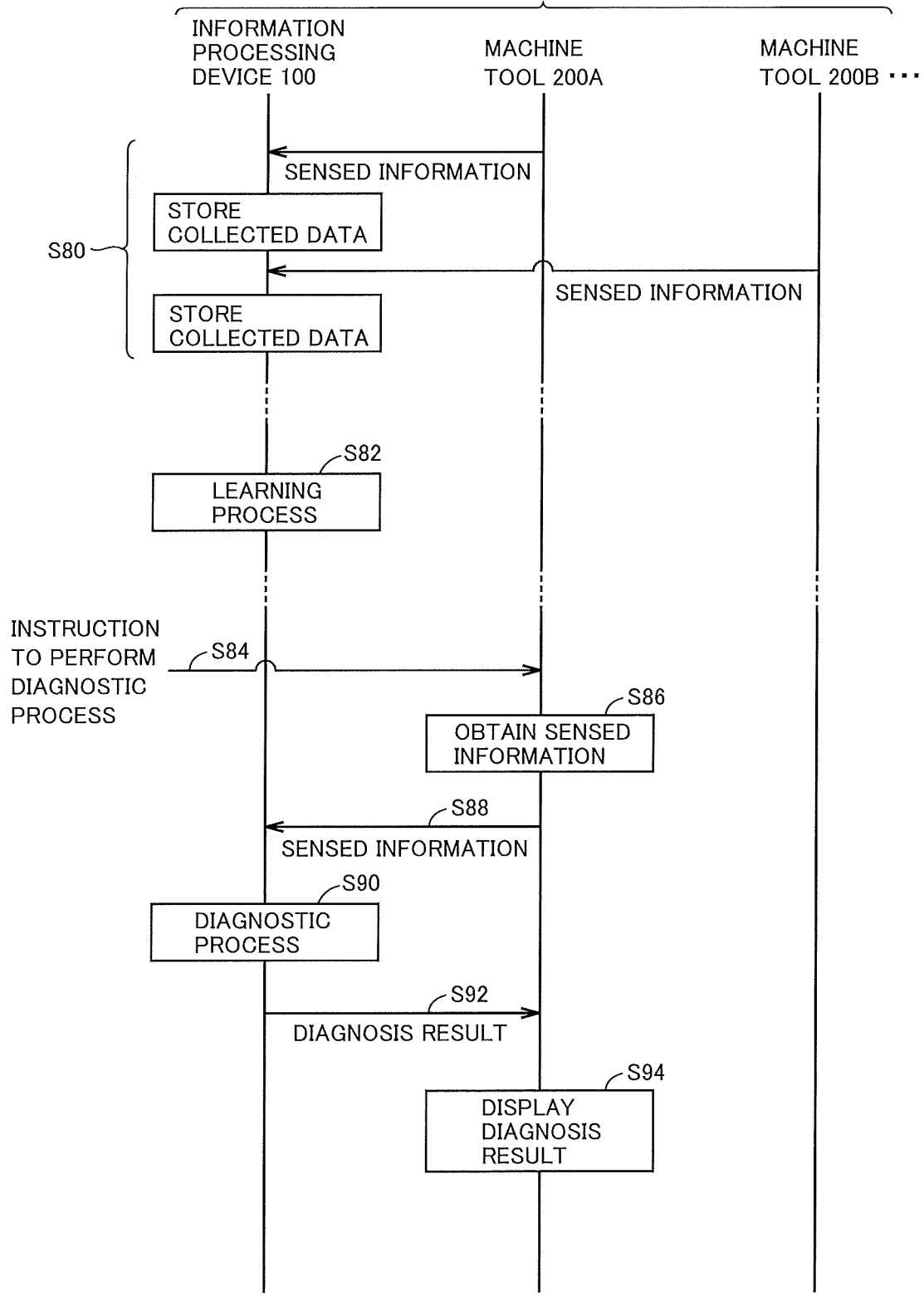
FIG. 17 is a sequence diagram showing a flow of data between the information processing device and a machine tool according to a sixth embodiment.

In the following, a learning process by information processing device 100 according to the sixth embodiment will be described with reference to FIGS. 17 to 19. FIG. 17 is a sequence diagram showing a flow of data between information processing device 100 and machine tools 200A, 200B according to the sixth embodiment.

In step S80, information processing device 100 periodically receives as collected data from machine tool 200A sensed information obtained by the sensor of machine tool 200A. The collected data received is stored in database 124 (see FIG. 3). Similarly, information processing device 100 periodically receives as collected data from machine tool 200B sensed information obtained by the sensor internal to machine tool 200B. The collected data received is stored in database 124 (see FIG. 3).

In step S82, in response to a learning instruction received from the user, information processing device 100 performs a process for learning the collected data accumulated in database 124. As a result, information processing device 100 learns the sensed information's normal range by type of sensor. As an example, information processing device 100 calculates the sensed information's average value and standard deviation for each type of sensor, and learns as the normal range a range between a lower limit value obtained by subtracting a predetermined multiple of the standard deviation from the average value and an upper limit value obtained by adding the predetermined multiple of the standard deviation from the average value.

FIG. 18 is a diagram showing an example of a learning result 126A as obtained through a learning process done by information processing device 100. In learning result 126A, a normal range for sensed information obtained by each sensor is defined by type of device and type of part. Learning result 126A is stored, for example, in storage device 120 of information processing device 100.

In step S84, it is assumed that machine tool 200A receives an instruction to perform a diagnostic process. Note that the user prepares in advance a workpiece of a specific size and a specific material in machine tool 200A, and executes a self-diagnosis program. Machine tool 200A thus executes an NC program prepared for self-diagnosis, and starts processing the workpiece using a specific tool.

In step S86, while processing the workpiece, machine tool 200A monitors and collects the sensor's sensed information. The sensed information to be collected includes, for example, fluctuation of a load of a motor that drives the spindle, fluctuation in temperature of the spindle, fluctuation in temperature of coolant, the spindle's vibration, fluctuation of a load of the motor related to a locus of a tool such as the XYAB axes, encoder locus data related to the locus of the tool such as the XYAB axes, and the like.

In step S88, machine tool 200A transmits to information processing device 100 the sensed information collected in step S86. After processing the workpiece in step S86 ends, a shape of a specific portion of the workpiece may be measured by a measuring unit (for example, a touch probe or the like) provided in machine tool 200A, and in that case, the measurement result is further transmitted to machine tool 200A.

In step S90, information processing device 100 diagnoses machine tool 200A based on the sensed information received from machine tool 200A. More specifically, information processing device 100 refers to learning result 126A obtained through the learning process performed in step S82 to determine whether each type of sensed information falls within the normal range, and diagnose machine tool 200A based on the determination. As an example, information processing device 100 compares machine tool 200A's state of vibration, machine tool 200A's temperature fluctuation range, machine tool 200A's quadrant glitch (backlash), machine tool 200A's operation load along each axis, etc. with normal ranges, respectively, specified in learning result 126A.

In step S92, information processing device 100 transmits to machine tool 200A a chart obtained as a diagnosis result obtained in step S90.

In step S94, machine tool 200A displays the diagnosis result received from information processing device 100. FIG. 19 is a diagram showing an example of a diagnosis result screen 260 displayed on display 210 of machine tool 200A.

As shown in FIG. 19, diagnosis result screen 260 shows a determination result indicating a normal level for each sensed information. Furthermore, for sensed information deviating from the normal range, a countermeasure (for example, adjustment, replacing a part, making a contact with a manufacturer, etc.) is indicated. Further, for sensed information within the normal range, a prediction of when a failure will occur is indicated from a degree of change as compared with past data.

Preferably, information processing device 100 stores a chart obtained as a diagnosis result whenever the diagnostic process is performed. As a result, information processing device 100 can accumulate a large number of charts, and, by machine-learning them together with a maintenance record, estimate a probability of occurrence of failure in the future.

As described above, information processing device 100 receives as collected data from various machine tools 200 sensed information obtained by each of a plurality of sensors in machine tool 200. Information processing device 100 accumulates in database 124 the collected data received from machine tool 200. Subsequently, based on the collected data accumulated in database 124, information processing device 100 learns a normal range for the sensed data by type of sensor. Thereafter, when information processing device 100 receives an instruction from any machine tool to diagnose the machine tool, information processing device 100 receives from the machine tool the sensed information obtained by the sensor internal to the machine tool, and refers to a learning result obtained through the above learning process to diagnose whether each of the sensed information received falls within a normal range corresponding thereto. Information processing device 100 transmits a diagnosis result to the machine tool that has issued the instruction to perform the diagnostic process.

This can help the user to diagnose machine tool 200 in a spare time, and thus allows maintenance personnel to conduct periodic diagnosis less frequently. In addition, accumulated diagnosis results can be utilized for failure prediction.

Seventh Embodiment

[Outline]

In information processing system 1 according to the first embodiment, information processing device 100 and machine tool 200 belong to the same network. In contrast, in information processing system 1 according to a seventh embodiment, information processing device 100 and machine tool 200 do not belong to the same network.

The remainder of information processing device 100 according to the seventh embodiment is the same as that of information processing device 100 according to the first embodiment, and accordingly, will not be described repeatedly.

[System Configuration of Information Processing System 1]

Figure 20:
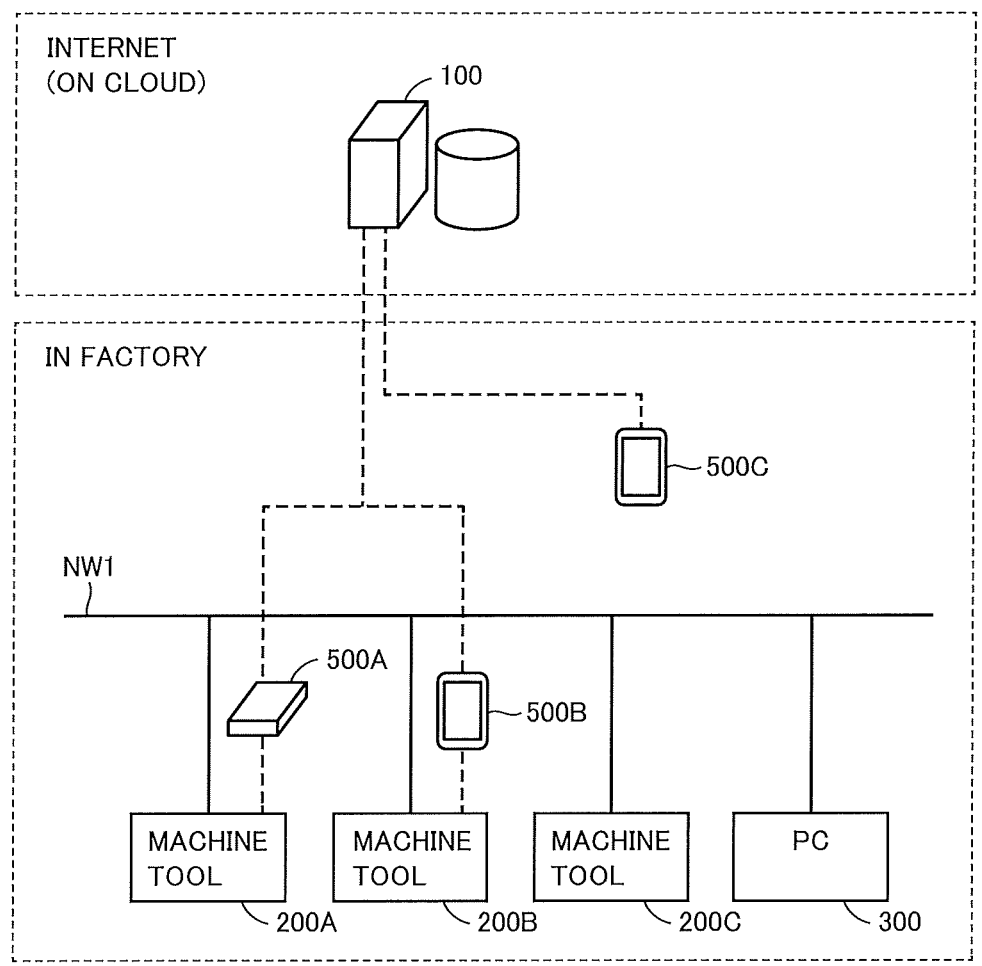
FIG. 20 is a diagram showing an example of a system configuration of an information processing system according to the seventh embodiment.

With reference to FIG. 20, a system configuration of information processing system 1 according to the seventh embodiment will be described. FIG. 20 is a diagram showing an example of the system configuration of information processing system 1 according to the seventh embodiment.

Information processing system 1 includes, for example, information processing device 100, machine tools 200A to 200C, a PC 300, and communication terminals 500A to 500C.

Machine tools 200A to 200C and PC 300 are connected to each other via a network NW1. Information processing device 100 and machine tools 200A to 200C are not networked directly. Separating information processing device 100 and the network of machine tools 200A to 200C ensures security.

In the present embodiment, information to be collected is transmitted from machine tool 200 to information processing device 100 via communication terminals 500A to 500C. Communication terminal 500A is, for example, a communication adapter. For communication terminal 500A, MMLink (registered trademark) or the like is adopted for example. Communication terminals 500B and 500C are portable terminals such as a smart phone and a tablet.

Eighth Embodiment

While in the above description an example in which information processing device 100 collects a sensor's sensed information or the like from machine tool 200 has been described, other information may be collected. FIG. 21 is a diagram showing an example of collected data 125 collected from machine tool 200 by information processing device 100. In addition to the above information, information processing device 100 also collects from machine tool 200 various pieces of information indicated in collected data 125.

SUMMARY

According to one aspect, an information processing method comprises the step of communicating with a plurality of machine tools. The plurality of machine tools each include a sensor to sense information about the machine tool as sensed information. The step of communicating includes the step of receiving as collected data from each of the plurality of machine tools part information about a part of the machine tool and the sensed information obtained by the sensor. The information processing method further comprises the steps of: storing in a storage unit the collected data received from each of the plurality of machine tools; and based on the plurality of collected data stored in the storage unit, learning a correlation between part information of a machine tool and sensed information obtained by the sensor internal to that machine tool.

Preferably, the step of communicating includes the step of receiving as the collected data from each of the plurality of machine tools the part information including a timing of replacing a part of the machine tool and sensed information obtained by the sensor that is obtained before the timing of replacing the part of the machine tool. The step of learning includes the step of learning a correlation between a timing of replacing a part of a machine tool and sensed information obtained by the sensor internal to that machine tool, based on the plurality of collected data stored in the storage unit. The information processing method further comprises a lifetime estimation portion such that when new sensed information obtained by the sensor is received from any of the plurality of machine tools and other machine tools, the lifetime estimation unit refers to the correlation to specify a timing of replacing a part, that corresponds to the new sensed information received, and estimate a lifetime for that part, based on the timing of replacing the part as specified.

Preferably, the step of communicating includes the step of receiving as the collected data from each of the plurality of machine tools the part information including a timing of a failure of a part of the machine tool and sensed information obtained by the sensor that is obtained before the timing of the failure of that part. The step of learning includes the step of learning a correlation between a timing of a failure of a part of a machine tool and sensed information obtained by the sensor internal to that machine tool, based on the plurality of collected data stored in the storage unit. The information processing method further comprises the steps of, when new sensed information obtained by the sensor is received from any of the plurality of machine tools and other machine tools, referring to the correlation to specify a timing of a failure of a part, that corresponds to the new sensed information received, and determine a timing of replacing that part, based on the timing of the failure as specified.

According to another aspect, an information processing method comprises the step of communicating with a plurality of machine tools. The step of communicating includes the step of receiving as collected data from each of the plurality of machine tools content of an alarm issued in the machine tool and a method performed for the machine tool to handle the alarm when the alarm is issued. The information processing method further comprises the steps of: storing in a storage unit the collected data received from each of the plurality of machine tools; and based on the plurality of collected data stored in the storage unit, learning for each type of the alarm a correlation between the alarm and the method performed to handle the alarm.

Preferably, the information processing method further comprises the step of, when a further alarm issued in any of the plurality of machine tools and other machine tools is received from that machine tool, referring to the correlation to determine a method for handling the further alarm received, and output the method as determined.

According to another aspect, an information processing method comprises the step of communicating with a plurality of machine tools. The plurality of machine tools each include a sensor to sense information about the machine tool as sensed information, and a recommending function for recommending a candidate for a recommended condition for a control parameter for reducing vibration of a spindle of the machine tool. The step of communicating includes the step of receiving as collected data from each of the plurality of machine tools the sensed information obtained by the sensor, a recommended condition selected from such candidates, and a result indicating whether the vibration is reduced by setting for the machine tool a control parameter corresponding to the recommended condition. The information processing method further comprises the steps of: storing in a storage unit the collected data received from each of the plurality of machine tools; and based on the plurality of collected data stored in the storage unit, learning a correlation among sensed information obtained by the sensor internal to a machine tool, a recommended condition selected from the candidates, and the result.

According to another aspect, an information processing method comprises the step of communicating with a plurality of machine tools. The plurality of machine tools each include a sensor to sense information about the machine tool as sensed information, and an interface for connecting to a correction device for correcting a control parameter for the machine tool. The step of communicating includes the step of receiving as collected data from each of the plurality of machine tools the sensed information obtained by the sensor and correction information of the control parameter corrected by the correction device. The information processing method further comprises the steps of: storing in a storage unit the collected data received from each of the plurality of machine tools; and based on the plurality of collected data stored in the storage unit, learning a correlation between sensed information obtained by the sensor internal to a machine tool and correction information provided by the correction device.

According to another aspect, an information processing method comprises the step of communicating with a plurality of machine tools. The plurality of machine tools each include a plurality of sensors to sense different types of information about the machine tool. The step of communicating includes the step of receiving as collected data from each of the plurality of machine tools sensed information obtained by each of the plurality of sensors internal to the machine tool. The information processing method further comprises the steps of: storing in a storage unit the collected data received from each of the plurality of machine tools; and based on the plurality of collected data stored in the storage unit, learning a normal range for sensed information for each of types of the plurality of sensors; when an instruction is received from any of the plurality of machine tools and other machine tools to conduct a diagnosis, receiving from that machine tool sensed information obtained by the plurality of sensors internal to the machine tool, and referring to a learning result obtained through the step of learning to make a diagnosis of whether each of the sensed information received falls within a normal range corresponding thereto; and transmitting the diagnosis to the machine tool that has issued the instruction.

According to another aspect, an information processing system comprises an information processing device, and a plurality of machine tools capable of communicating with the information processing device. The plurality of machine tools each include a sensor to sense information about the machine tool as sensed information. The information processing device includes: a communication unit configured to receive as collected data from each of the plurality of machine tools part information about a part of the machine tool and the sensed information obtained by the sensor; a storage unit configured to store the collected data received from each of the plurality of machine tools; and a learning unit configured to learn, based on the plurality of collected data stored in the storage unit, a correlation between part information of a machine tool and sensed information obtained by the sensor internal to that machine tool.

According to another aspect, an information processing device comprises a communication unit configured to communicate with a plurality of machine tools. The plurality of machine tools each include a sensor to sense information about the machine tool as sensed information. The communication unit receives as collected data from each of the plurality of machine tools part information about a part of the machine tool and the sensed information obtained by the sensor. The information processing device further comprises a storage unit configured to store the collected data received from each of the plurality of machine tools, and a learning unit configured to learn, based on the plurality of collected data stored in the storage unit, a correlation between part information of a machine tool and sensed information obtained by the sensor internal to that machine tool.

It should be understood that the embodiments disclosed herein are illustrative and non-restrictive in any respect. The scope of the present invention is defined by the terms of the claims, rather than the above description, and is intended to include any modifications within the meaning and scope equivalent to the terms of the claims.

REFERENCE SIGNS LIST

1 information processing system, 100 information processing device, 101, 201 control device, 102, 202 ROM, 103, 203 RAM, 104, 204 communication interface, 105, 205 display interface, 106, 209 input interface, 110, 210 display, 111 input device, 120, 220 storage device, 122 information processing program, 124, 124A, 124B database, 125, 125A-125P collected data, 126 correlation, 126A learning result, 152 communication unit, 154 learning unit, 156 lifetime estimation unit, 158 failure determination unit, 200A-200D machine tool, 206 temperature sensor, 207 acceleration sensor, 208 current sensor, 222 control program, 230, 231 input area, 232 registration button, 233 cancel button, 241 FFT unit, 243 sensed information, 245 recommended condition, 246 operation result, 248 interface, 250 correction device, 260 diagnosis result screen, 300A, 300B, 500A-500C communication terminal, 401 router.

The invention claimed is:

1. An information processing method comprising the steps of:
   communicating with a plurality of machine tools, the plurality of machine tools each including a sensor to sense information about each of the plurality of machine tools as sensed information,
   the step of communicating including the step of receiving as collected data from each of the plurality of machine tools part information about a part of each of the plurality of machine tools and the sensed information obtained by each sensor;
   storing in a storage unit the collected data received from each of the plurality of machine tools;
   based on the collected data stored in the storage unit, learning for each type of the part a correlation between part information of each of the plurality of machine tools of the plurality of machine tools and respective sensed information obtained by the sensor for each of the plurality of machine tools;
   utilizing at least one of the plurality of machine tools to process at least one workpiece and to collect current operation data; and
   performing a self-diagnosis routine utilizing the correlation and the current operation data.

2. The information processing method according to claim 1,
   the step of communicating including the step of receiving as the collected data from each of the plurality of machine tools the part information including a timing of replacing a part of each of the plurality of machine tools and sensed information obtained by each sensor that is obtained before the timing of replacing the part of each of the plurality of machine tools,
   the step of learning including the step of learning a correlation between the timing of replacing a part of each of the plurality of machine tools and sensed information obtained by each sensor of each of the plurality of machine tools, based on the collected data stored in the storage unit,
   the method further comprising a step of estimating a lifetime such that when new sensed information obtained by each sensor is received from any of the plurality of machine tools and other machine tools, a lifetime estimation unit refers to the correlation to specify the timing of replacing a part, that corresponds to the new sensed information received, and estimates the lifetime for the part, based on the specified timing.

3. The information processing method according to claim 1, the step of communicating including the step of receiving as the collected data from each of the plurality of machine tools the part information including a timing of a failure of a part of each of the plurality of machine tools and sensed information obtained by each sensor that is obtained before the timing of the failure of a part,
   the step of learning including the step of learning a correlation between the timing of a failure of a part of each of the plurality of machine tools and sensed information obtained by each sensor of the plurality of machine tools, based on the collected data stored in the storage unit,
   the method further comprising the step of
   when new sensed information obtained by each sensor is received from any of the plurality of machine tools and other machine tools, referring to the correlation to specify the timing of a failure of a part, that corresponds to the new sensed information received, and determine a timing of replacing that part, based on the specified timing.

4. An information processing system comprising:
   an information processing device; and
   a plurality of machine tools capable of communicating with the information processing device, the plurality of machine tools each including a sensor to sense information about each of the plurality of machine tools as sensed information,
   the information processing device including
     a communication unit configured to receive as collected data from each of the plurality of machine tools part information about a part of each of the plurality of machine tools and the sensed information obtained by each sensor,
     a storage unit configured to store the collected data received from each of the plurality of machine tools, and
     a learning unit configured to learn for each type of the part, based on the plurality of collected data stored in the storage unit, a correlation between part information of each of the plurality of machine tools and sensed information obtained by each sensor; wherein
the information processing device is configured to collect current operation data in the case that at least one workpiece is processed by at least one of the plurality of machine tools and to perform a self-diagnosis routine utilizing the correlation and the current operation data.

5. An information processing device comprising: a communication unit configured to communicate with a plurality of machine tools,
the plurality of machine tools each including a sensor to sense information about each of the plurality of machine tools as sensed information,
the communication unit receiving as collected data from each of the plurality of machine tools part information about a part of each of the plurality of machine tools the machine tool and the sensed information obtained by each sensor;
a storage unit configured to store the collected data received from each of the plurality of machine tools; and
a learning unit configured to learn for each type of the part, based on the plurality of collected data stored in the storage unit, a correlation between part information of each of the plurality of machine tools and sensed information obtained by each sensor; wherein the information processing device is configured to collect current operation data in the case that at least one workpiece is processed by at least one of the plurality of machine tools and to perform a self-diagnosis routine utilizing the correlation and the current operation data.

* * * * *